(12) United States Patent  (10) Patent No.: US 7,927,756 B2
Hibino et al.  (45) Date of Patent: Apr. 19, 2011

(54) REDOX FUEL CELL USING METHANOL

(75) Inventors: Seiji Hibino, Kawasaki (JP); Masami Tsutsumi, Kawasaki (JP); Kensuke Yoshida, Kawasaki (JP); Hiroaki Yoshida, Kawasaki (JP); Yoichi Takasu, Kawasaki (JP); Nawalage Florence Cooray, Kawasaki (JP); Fumio Takei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 11/503,986

(22) Filed: Aug. 15, 2006

(65) Prior Publication Data

US 2006/0275639 A1  Dec. 7, 2006

Related U.S. Application Data

(63) Continuation of application No. PCT/JP2004/002076, filed on Feb. 23, 2004.

(51) Int. Cl.
*H01M 8/10* (2006.01)
(52) U.S. Cl. ........ 429/491; 429/479; 429/493; 429/314; 429/317; 521/25
(58) Field of Classification Search .......... 429/33, 429/30, 314, 317, 491, 479, 493; 521/25
See application file for complete search history.

(56) References Cited

U.S. PATENT DOCUMENTS

| | | | |
|---|---|---|---|
| 5,362,836 A | 11/1994 | Helmer-Metzmann et al. | |
| 5,409,785 A | 4/1995 | Nakano et al. | |
| 6,395,429 B1 | 5/2002 | Kang et al. | |
| 6,602,630 B1 * | 8/2003 | Gopal | 429/30 |
| 6,811,905 B1 * | 11/2004 | Cropley et al. | 429/30 |
| 7,563,850 B2 * | 7/2009 | Kinouchi et al. | 429/303 |

FOREIGN PATENT DOCUMENTS

| | | |
|---|---|---|
| JP | 6-49202 A | 2/1994 |
| JP | 6-76838 A | 3/1994 |

(Continued)

OTHER PUBLICATIONS

Abstract of 6,602,630 taken from a search done 2009.*

(Continued)

*Primary Examiner* — Laura S Weiner
(74) *Attorney, Agent, or Firm* — Westerman, Hattori, Daniels & Adrian, LLP

(57) ABSTRACT

In the present invention, a material having a structure represented by formula (1) or (2) (wherein W equals N or C) is used as a solid electrolyte for a fuel cell. An electrolyte membrane having a small fuel crossover and a fuel cell having excellent ion conductivity and service capacity are obtained.

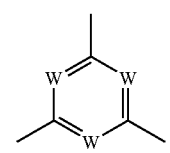

(1)

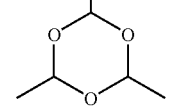

(2)

6 Claims, 17 Drawing Sheets

Benzene ring

Triazine ring

Trioxane ring

FOREIGN PATENT DOCUMENTS

| | | | |
|---|---|---|---|
| JP | 6-275301 A | | 9/1994 |
| JP | 11-144745 A | | 5/1999 |
| JP | 2000-212305 A | | 8/2000 |
| JP | 2001-40168 A | | 2/2001 |
| JP | 2001-354641 A | | 12/2001 |
| JP | 2003-217343 | * | 7/2003 |
| JP | 2003-217365 A | | 7/2003 |
| JP | 2003-335835 A | | 11/2003 |
| JP | 2003-338298 | * | 11/2003 |
| JP | 2005-133092 A | | 5/2005 |
| KR | 187430 | * | 5/1999 |
| WO | WO 03/046080 | * | 6/2003 |
| WO | WO 2004/004053 | * | 1/2004 |

OTHER PUBLICATIONS

International Search Report of PCT/JP2004/002076 date of mailing May 25, 2004.

Japanese Office Action dated Oct. 27, 2009 issued in corresponding Japanese patent Application No. 2006-510138.

Office Action dated Jul. 7, 2010, issued in corresponding German Patent Application No. 11 2004 002 716.45.

* cited by examiner

Benzene ring

Triazine ring

Trioxane ring

FIG. 14
Negative electrode: $CH_3OH + H_2O \rightarrow CO_2 + 6H^+ \; 6e^-$
Positive electrode: $O_2 + 4H^+ + 4e^- \rightarrow 2H_2O$
FIG. 15
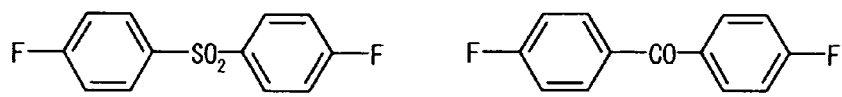
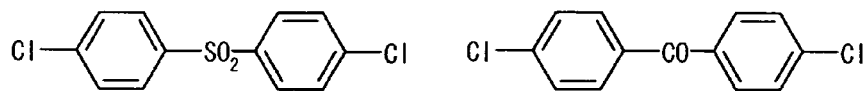
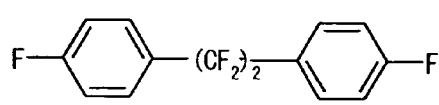
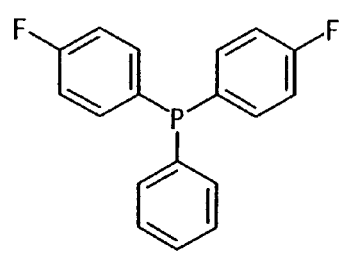
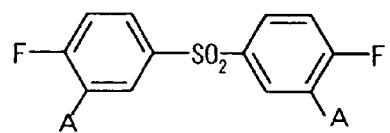
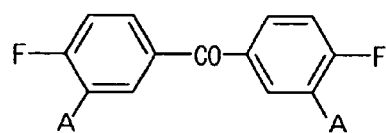

4-Flurophenylsulfone

4-Fluorobenzophenone

4-Fluorophenylsulfone-3,3'-sodium disulfonate

4-Fluorobenzophenone-3,3'-sodium disulfonate

REDOX FUEL CELL USING METHANOL

CROSS-REFERENCE TO RELATED APPLICATIONS

This application is a continuation of International Application No. PCT/JP2004/002076, filed on Feb. 23, 2004, now pending, herein incorporated by reference.

BACKGROUND OF THE INVENTION

1. Field of the Invention

The present invention relates to a fuel cell.

2. Description of the Related Art

In mobile information devices, drastic advances have been made in recent years, in terms of effecting miniaturization, weight reduction, and higher functionality. Also, with the development of information devices and apparatuses, advances have been made steadily in terms of effecting miniaturization, weight reduction, and higher capacity of cells as electric sources for their use.

The most popular electric power source for driving the current mobile telephone devices is a lithium ion cell. The lithium ion cell had a high driving voltage and a high cell capacity at the onset of the practical application, and the performance has been improved to keep pace with the development of the mobile telephone devices. However, there is a limitation to the performance improvement of the lithium ion cells, and it is becoming more and more difficult for the lithium ion cells to satisfy requirements (a higher service capacity, for example) as a power source for driving mobile telephone devices for which demand for a higher functionality is expected to increase more and more in future.

Under such a situation, hopes are concentrated on the development of new electric power generation devices which can substitute for lithium ion cells. A fuel cell is one of the new electric power generation devices. A fuel cell is a device for generating electricity through generating electrons and protons by supplying a fuel to the negative electrode, and reacting the protons with oxygen supplied to the positive electrode.

The most significant feature of this system is that a long-time continuous electricity generation is possible through supply of a fuel and oxygen, and accordingly, can be applied to electric power sources for various devices in the same way as the secondary cells by refueling instead of charging of the secondary cells. Because of this, developments on the fuel cell are progressing actively not only for dispersed power sources and for large-scale generators for the electric car use, but also for ultracompact electricity generating units for notebook-size personal computers and mobile telephones.

In the field of small fuel cells particularly, investigations are actively progressing on fuel cells for which an aqueous methanol solution is used as a fuel. At present, Nafion, a perfluorosulfonic acid polymer from du Pont is a mainstream material for a solid electrolyte for use in such a small fuel cell. However, Nafion membranes are known to have a high affinity for alcohol for use as a fuel, and have high swelling characteristics. As a result, the fuel penetrates into the air electrode (positive electrode) side, causing problems of decrease in the output density and electric generation capacity. The very high price of Nafion is also a factor which prevents fuel cells from being more popularized. Hence, expectations are growing for inexpensive materials that can substitute for Nafion.

As a method for solving such problems, it was reported that engineering plastics are subjected to sulfonation with fuming sulfuric acid or the like in order to form inexpensive electrolyte membranes with a restricted fuel crossover (fuel permeation) {see, for example, Japanese Unexamined Patent Application Publication No. H06-49202 (claims)}. However, with this method, it is difficult to control the rate of sulfonation of an electrolyte membrane, and it is also difficult to control the swelling characteristics of an electrolyte formed.

As a method for controlling the swelling characteristics together with the mechanical strength, methods by means of polymer blending and copolymerization are investigated {see, for example, Japanese Unexamined Patent Application Publications No. H06-76838 (paragraph 0016, 0017), and No. H6-275301 (paragraph 0006)}. However, it is the principal objective of these methods to increase the mechanical strength, and accordingly, it is not very effective for restricting fuel crossover of the electrolyte membrane, and higher ion conductivity can hardly be expected.

A structure given by chemically cross-linking a polymer is disclosed as a method for controlling the swelling characteristics {see, for example, Japanese Unexamined Patent Application Publications No. 2003-217365 (claims)}. With this method, it is possible to introduce a cross-linked structure. However, it is difficult to selectively decide positions to be cross-linked, and therefore, it is thought to be impossible to make an electrolyte membrane with uniform properties as a whole.

SUMMARY OF THE INVENTION

Accordingly, it is an object according to the present invention to solve the above-described problems, and provide a solid electrolyte that can be formed into an electrolyte membrane that has a restricted fuel crossover, and is not dissolved even at a high ion exchange capacity. Other objects and advantages according to the present invention will be clarified through the following explanations.

According to one aspect of the present invention, a solid electrolyte having a structure represented by formula (1) or (2) is provided. In formula (1), W means N or C.

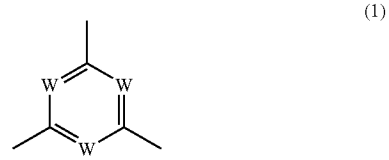

(1)

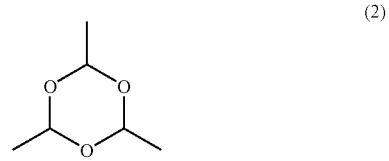

(2)

In formulae (1), it is preferable that W equals N.

According to another aspect of the present invention, a solid electrolyte having a structure represented by formula (3) or (4) is provided.

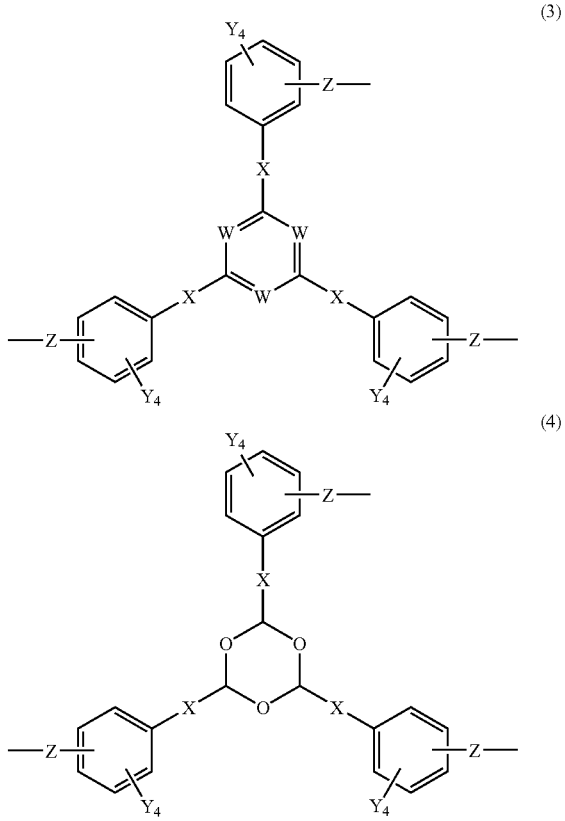

(3)

(4)

In formula (3) and (4), Ws are, each, same or different, N or C; Xs are, same or different, and in each formula independently from the other formula, one of a direct bond, O, S, $(CH_2)_m$, $(CF_2)_m$, $O—(CH_2)_m—O$, and $O—(CF_2)_m—O$ where m is an integer of from 1 to 10; Ys are, same or different, and in each formula independently from the other formula, one of H, F, $CH_3(CH_2)_n$, and $CF_3(CF_2)_n$ where the suffix 4 of Y means that four Ys are bound to a benzene ring, and n is an integer of from 0 to 9; and Zs are, same or different, and in each formula independently from the other formula, one of O, S, $(CH_2)_p$, $(CF_2)_p$, $O—(CH_2)_p—O$, and $O—(CF_2)_p—O$ where p is an integer of from 1 to 10, and Z may be bound to any position of a benzene ring.

In formula (3), W is preferably N.

In any of the aspects, preferable are that the solid electrolyte has an acidic functional group; that the acidic functional group is at least one group selected from the group consisting of a sulfonic acid group, a phosphonic acid group, a carboxylic acid group and a phosphoric acid group; that the solid electrolyte has an ion-exchange capacity in the range of from 0.1 to 3.5 milli equivalent/g; that the solid electrolyte has at least one structure selected from the group consisting of a polyethersulfone structure, a polyetherketone structure and a polyimide structure; and that the solid electrolyte has a structure represented by formula (5).

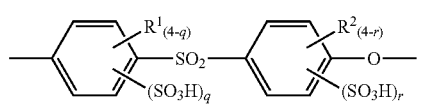

(5)

In formula (5), $SO_3H$ may be bound to any position of a benzene ring; q and r are, independently from each other, an integer of from 0 to 2 (where q and r are not zero at the same time); $R^1$ and $R^2$ are, independently from each other, hydrogen, an aliphatic group or an aromatic group which may be bound to any position of a benzene ring.

According to still another aspect of the present invention, provided is a solid electrolyte formed by polymerizing a compound having a structure represented by formula (6) or (7), at least one compound selected from the group consisting of a compound having a structure represented by formula (8), a compound having a structure represented by formula (9) and a compound having a structure represented by formula (10), and at least one compound selected from the group consisting of a compound having a structure represented by formula (11), a compound having a structure represented by formula (12) and a compound having a structure represented by formula (13). In any case, at least one of the compound having a structure represented by formula (10) and the compound having a structure represented by formula (13) is present without fail.

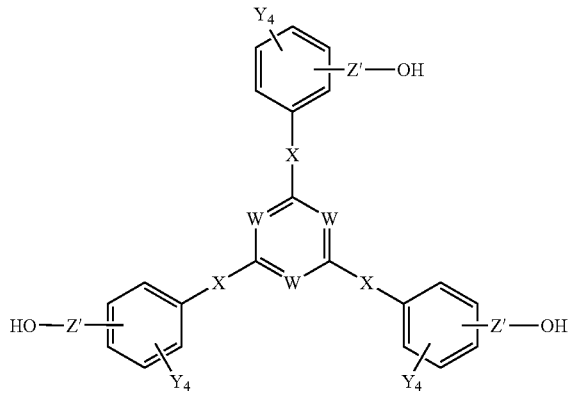

(6)

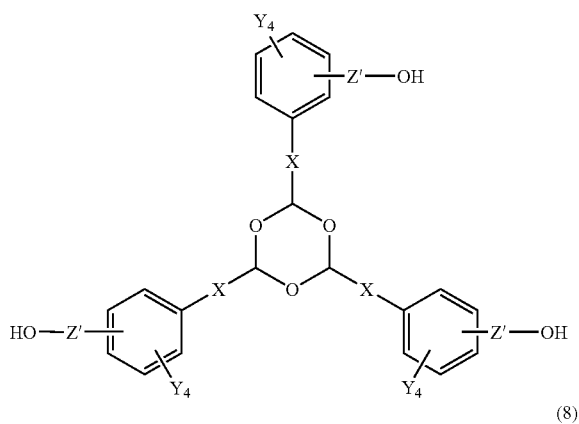

(7)

HO—$Ar_1$—OH (8)

HO—$Ar_2$—X'—$Ar_3$—OH (9)

HO—$Ar_4$—X'—$Ar_5$—OH (10)

X"—$Ar_1$—X" (11)

X"—$Ar_2$—X'—$Ar_3$—X" (12)

X"—$Ar_4$—X'—$Ar_5$—X" (13)

In formulae (6) to (13), Ws are, each, same or different, N or C; Xs are, same or different, and in each formula independently from the other formulae, one of a direct bond, O, S, $(CH_2)_m$, $(CF_2)_m$, $O-(CH_2)_m-O$, and $O-(CF_2)_m-O$ where m is an integer of from 1 to 10; Ys are, same or different, and in each formula independently from the other formulae, one of H, F, $CH_3(CH_2)_n$, and $CF_3(CF_2)_n$ where the suffix 4 of Y means that four Ys are bound to a benzene ring, and n is an integer of from 0 to 9; and Z's are, same or different, and in each formula independently from the other formulae, one of a direct bond, $(CH_2)_s$, $(CF_2)_s$, $O-(CH_2)_s$, and $O-(CF_2)_s$ where s is an integer of from 1 to 10, and Z's may be bound to any position of a benzene ring; $Ar_1$ to $Ar_5$ are, independently from each other, an aromatic group that may have a substituent group where at least one of $Ar_4$ and $Ar_5$ has, as a group directly bound to the aromatic group, one or more groups selected from the group consisting of a sulfonic acid group, a phosphonic acid group, a carboxylic acid group, a phosphoric acid group, and a salt of any of them; X's are, in each formula independently from the other formulae, one of $-SO_2-$, $-CH_2-$, $-C(CH_3)_2-$, $-C(CF_3)_2-$, $-CO-$, $-O-$, $-O(CH_2)_nO-$, $-O(CF_2)_nO-$, $-(CH_2)_n-$, $-(CF_2)_n-$, etc., where n is an integer of from 1 to 10; and X"s are, in each formula independently from the other formulae, and independently in each formula, chlorine or fluorine.

It is preferable that at least one of $Ar_4$ and $Ar_5$ has, as a group directly bound to the aromatic group, one or more sulfonic acid groups or sulfonate groups.

By the above-described various aspects, an electrolyte with a small fuel crossover is obtained. Fuel cells using this electrolyte show excellent ion conductivity and service capacity.

According to still another aspect of the present invention, a fuel cell such as a redox fuel cell with methanol using the solid electrolyte is obtained.

By the present invention, a fuel cell having an excellent electricity generation capacity is provided. More specifically, a fuel cell is provide which has a electrolyte membrane having a small fuel crossover, and shows an excellent ion conductivity and service capacity.

BRIEF DESCRIPTION OF THE DRAWINGS

FIG. 14 shows formulae of chemical reactions at electrodes;

FIG. 15 shows other examples of a compound that can form a linear structure according to the present invention;

DESCRIPTION OF THE PREFERRED EMBODIMENTS

Embodiments according to the present invention are explained below using figures, tables, formulae, examples and the like. These figures, tables, formulae, examples and the like as well as the explanations exemplify the present invention, and do not limit its scope. Other embodiments can of course fall within the scope according to the present invention to the extent that they match the intent according to the present invention.

In the solid electrolyte according to the present invention, a specific polyfunctional structure is introduced into a solid electrolyte used for an electrolyte membrane so that the fuel crossover is restricted by controlling the compatibility between the solid electrolyte and a solvent, and no problems of dissolving, etc. occur even at a high ion-exchange capacity. By this, a fuel cell having excellent ion conductivity and service capacity is provided. Here, dissolving means dissolving of an electrolyte membrane by the aqueous methanol fuel solution. It is a phenomenon that an electrolyte membrane dissolves into the aqueous methanol solution when it is tried to raise the ion-exchange capacity over a certain level.

A solid electrolyte according to the present invention has an structure represented by formula (1) or (2). In formula (1), W means N (nitrogen) or C (carbon).

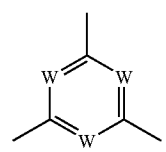

(1)

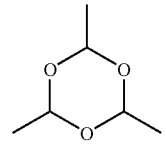

(2)

Figure 1:
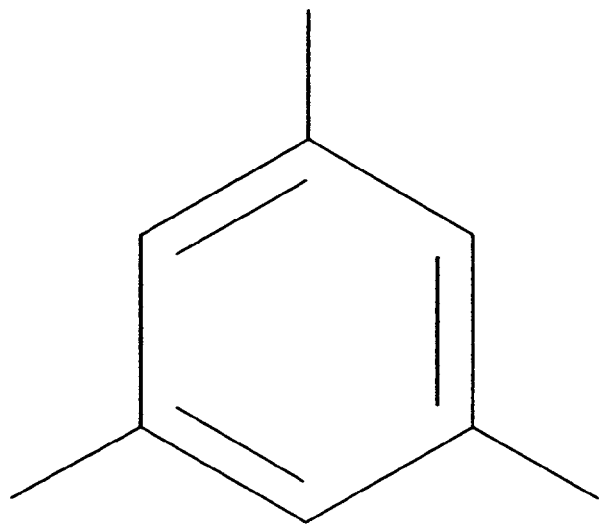
FIG. 1 shows examples of a three-armed structure according to the present invention.
Figure 1:
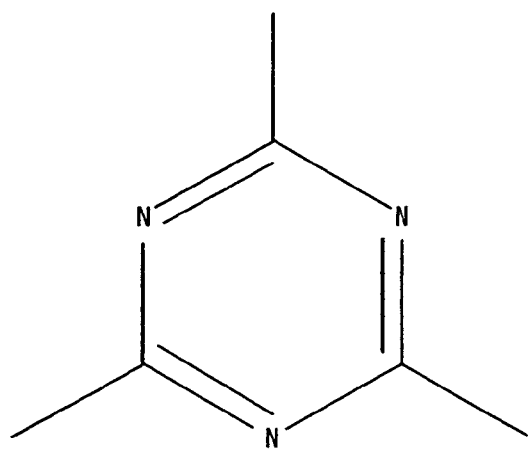
Figure 1:
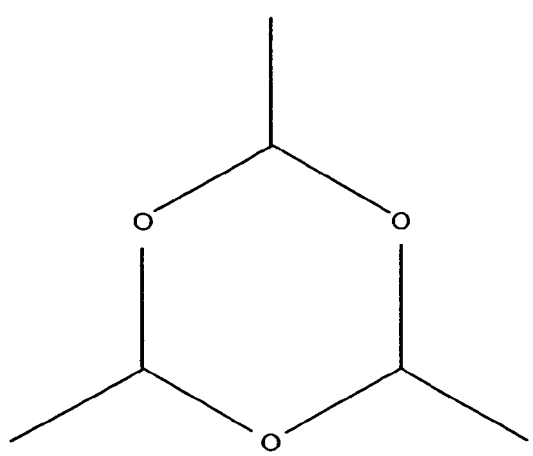

When a three-armed structure having a benzene ring, triazine ring, and/or trioxane ring as shown in FIG. 1, is introduced, it is possible to easily regulate the cross-linking density and the cross-linking positions in a solid electrolyte, by regulating the amount to be introduced, so as to restrict the fuel crossover. Particularly preferable is a triazine ring in which W equals N.

The three-armed structure may be bound to other structures in the solid electrolyte by any bonding. The bonding is preferably one via O (oxygen) in view of ease of manufacture of the solid electrolyte.

It is more preferable that a solid electrolyte according to the present invention has a structure represented by formula (3) or (4). When such a three-armed structure is introduced, it is possible to easily regulate the cross-linking density and the cross-linking positions in a solid electrolyte, by regulating the amount to be introduced, so as to restrict the fuel crossover more easily. Particularly preferable is a structure having a triazine ring wherein W equals N.

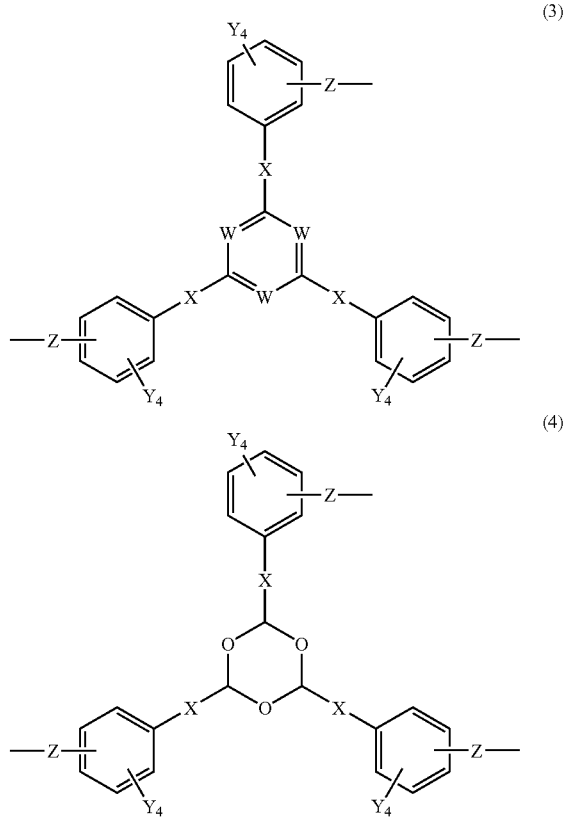

In formulae (3) and (4), Ws are, each, same or different, N or C; Xs are, same or different, and in each formula independently from the other formula, one of a direct bond, O, S, $(CH_2)_m$, $(CF_2)_m$, $O—(CH_2)_m—O$, and $O—(CF_2)_m—O$ where m is an integer of from 1 to 10; Ys are, same or different, and in each formula independently from the other formula, one of H, F, $CH_3(CH_2)_n$, and $CF_3(CF_2)_n$ where the suffix 4 of Y means that four Ys are bound to a benzene ring, and n is an integer of from 0 to 9; and Zs are, same or different, and in each formula independently from the other formula, one of O, S, $(CH_2)_p$, $(CF_2)_p$, $O—(CH_2)_p—O$, and $O—(CF_2)_p—O$ where p is an integer of from 1 to 10, and Z may be bound to any position of a benzene ring.

Figure 2:
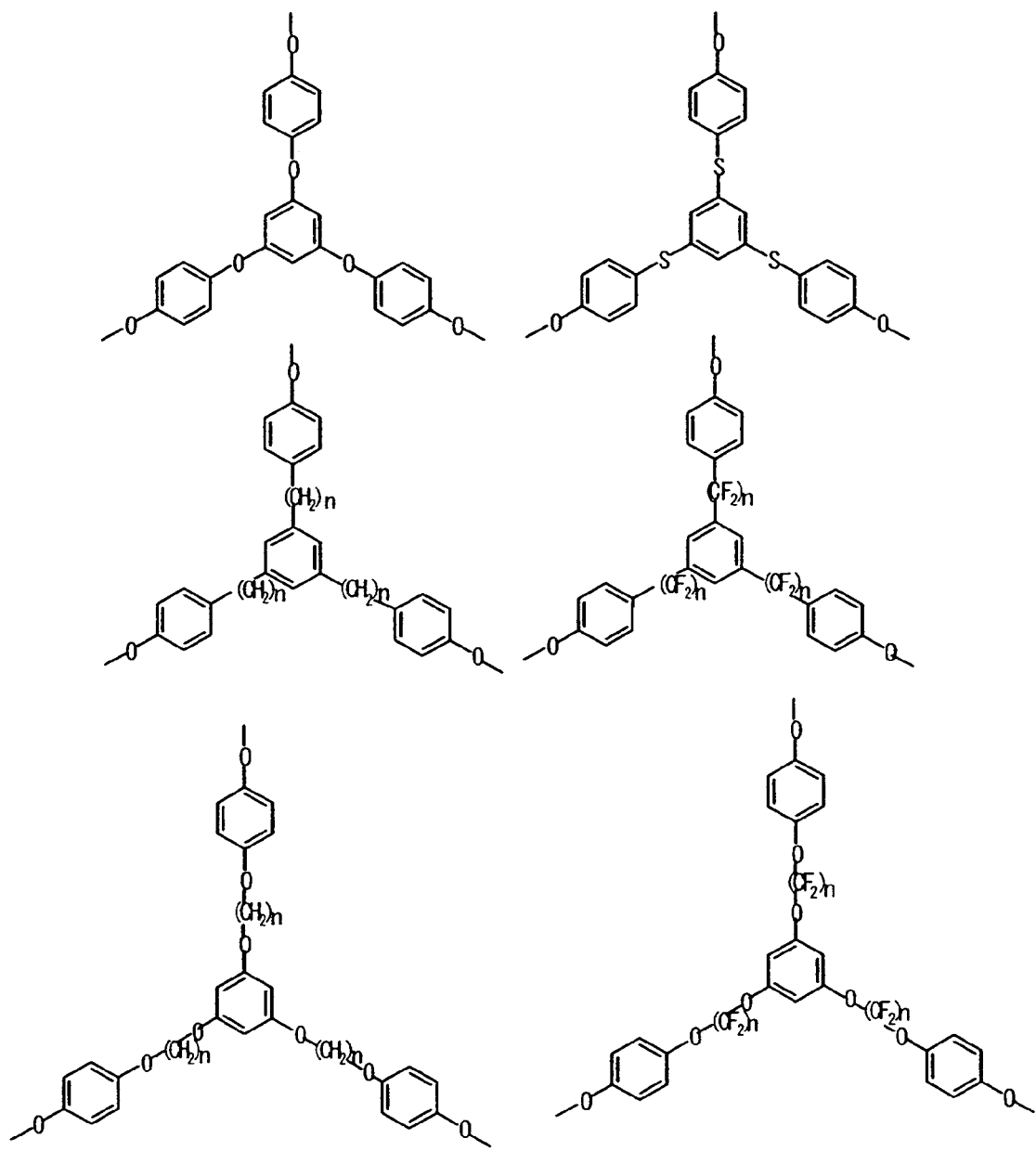
FIG. 2 shows other examples of a three-armed structure according to the present invention.

As specific examples of structures having these three-armed structures, those obtained by eliminating the three terminal OH groups from the trifunctional compounds shown in FIGS. 5-12 that will be described later, can be enumerated. For example, elimination of H from the OH groups of those in FIG. 5 will result in the structures in FIG. 2.

It is to be noted here that an electrolyte according to the present invention preferably has an acidic functional group for letting protons pass therethrough. This acidic functional group can be formed on a structure part that is different from the above-described structures in the solid electrolytes according to the present invention. The acidic functional group is preferably at least one group selected from the group consisting of a sulfonic acid group, a phosphonic acid group, a carboxylic acid group and a phosphoric acid group. They may be used together. A sulfonic acid group is preferable in view of ease of synthesis and its high ion conductivity.

Too small an amount of these groups in a solid electrolyte according to the present invention is not desirable because it will result in insufficient ion conductivity, while too large an amount of them is not desirable, either, because it will result in increased swelling level of the electrolyte membrane, increased methanol crossover (methanol permeation), and/or dissolving of the electrolyte. However, it is not easy to exactly determine the concentration of these groups in a solid electrolyte according to the present invention. As a result of investigations, it was found that the ion-change capacity can be a good indicator of the concentration. Specifically, it is preferably in the range of 0.1-3.5 milli equivalent/g. More preferably, it is in the range of 0.1-2.8 milli equivalent/g.

In the above-described three-armed structure, it is possible to regulate the cross-linking density and cross-linking positions in a solid electrolyte, by having the three-armed structure bond to parts having a linear structure. In this way, it becomes easy to restrict the fuel crossover.

Figure 19:
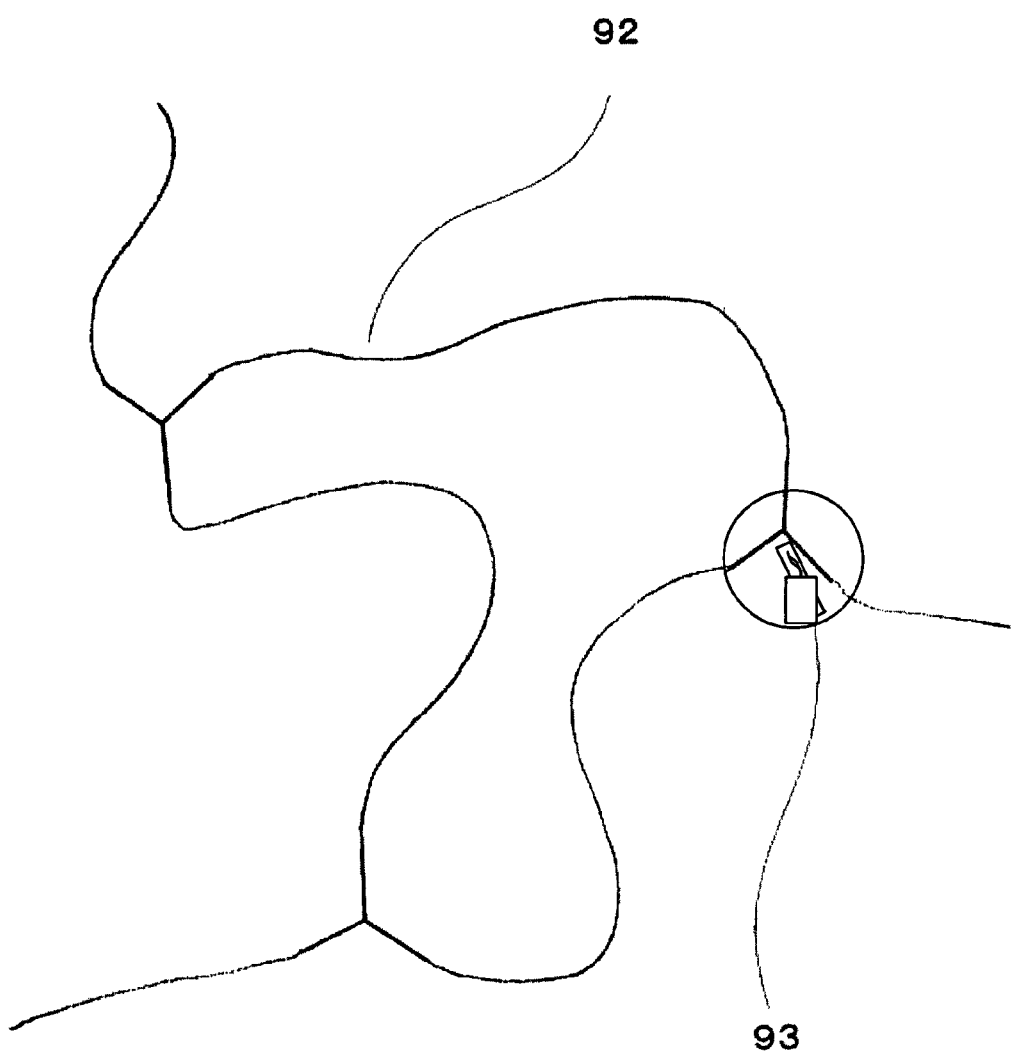
FIG. 19 is a schematic view showing a cross-linked structure according to the present invention.

The cross-liked structure is schematically shown in FIG. 19. In FIG. 19, numeral 93 indicates an area having a three-armed structure part, and numeral 92, a linear structure part. It is to be noted that FIG. 19 is merely a schematic view, and it is understood that, in reality, the network has a three-dimensional expanse. The regulation of the cross-linking density and cross-linking positions in a solid electrolyte can be achieved by having an appropriate amount of a polyfunctional monomer or monomers react with an oligomer and/or polymer obtained by oligomerization and/or polymerization of a compound or compounds that can form a linear structure (which will be described later), in a state that the molecular lengths of the oligomer and/or polymer are appropriately adjusted. In this way, it is possible to control the compatibility between the electrolyte with a three-armed structure and a solvent and provide a solid electrolyte that can restrict the fuel crossover, and is not dissolved even at a high ion-change capacity.

Figure 3:
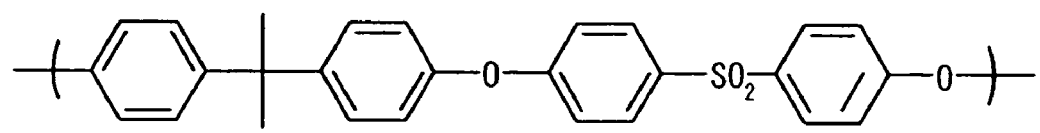
FIG. 3 shows examples of a linear structure according to the present invention.
Figure 3:
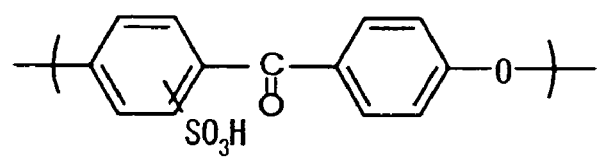
Figure 3:
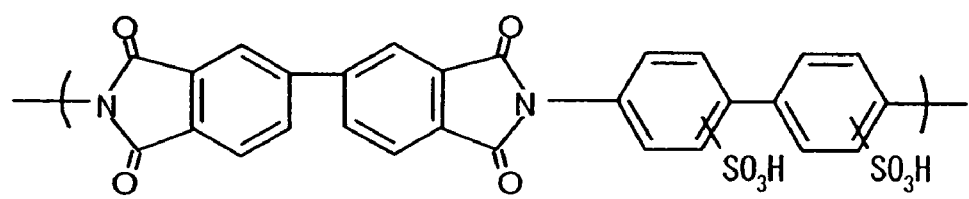
Figure 3:
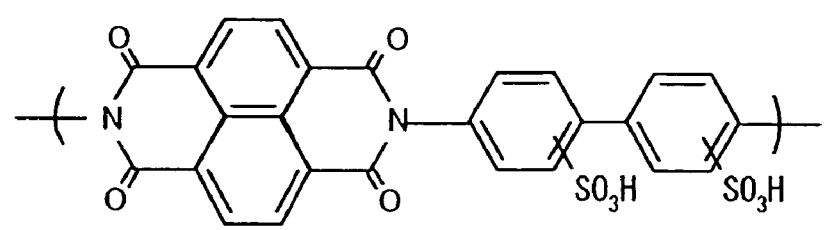
Figure 4:
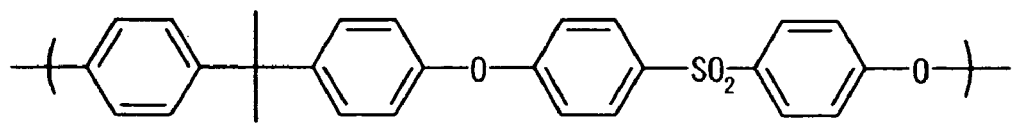
FIG. 4 shows other examples of a linear structure according to the present invention.
Figure 4:
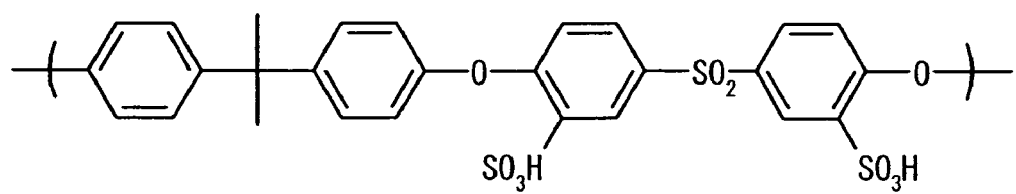
Figure 5:
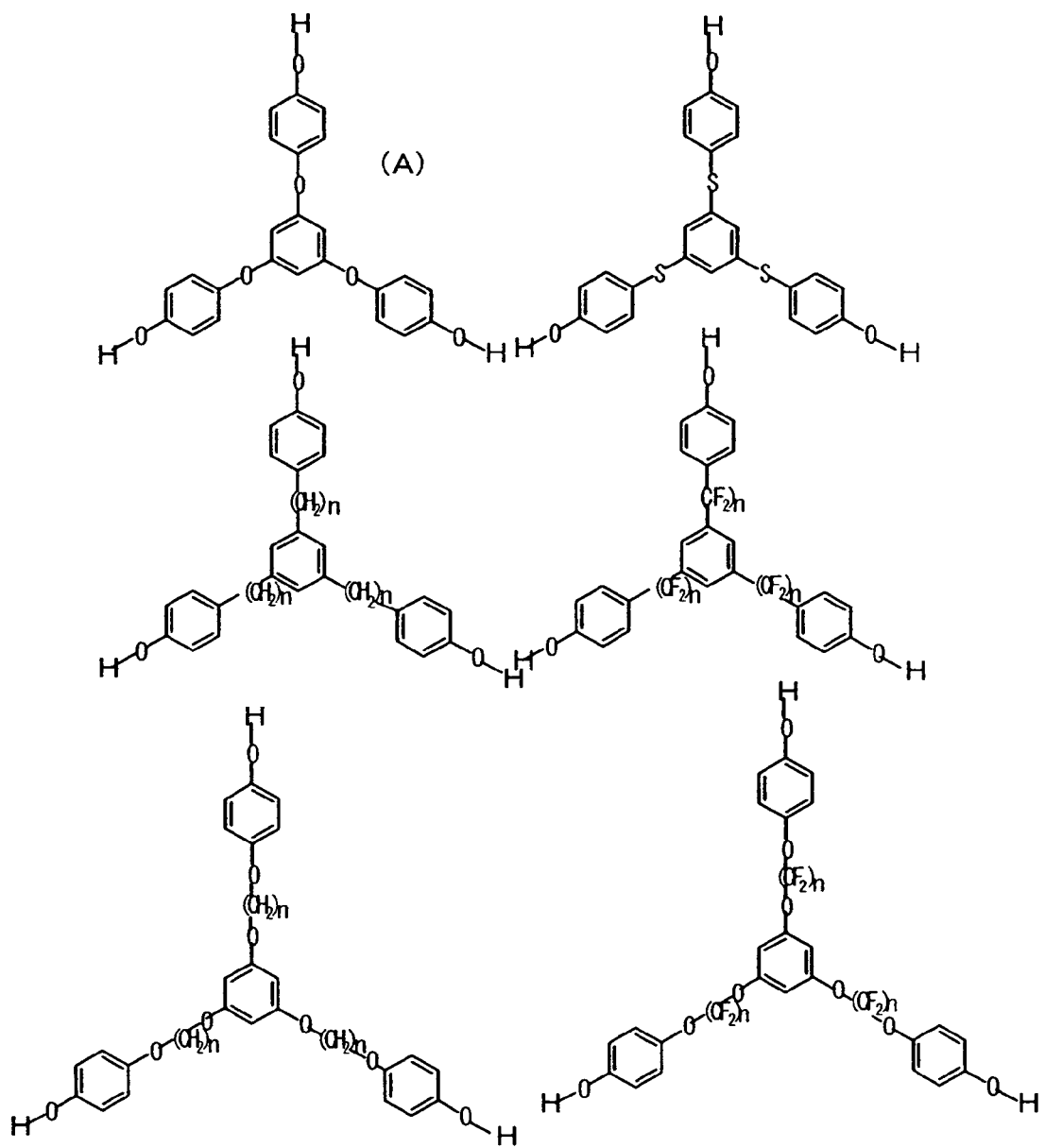
FIG. 5 shows examples of a trifunctional compound according to the present invention.
Figure 6:
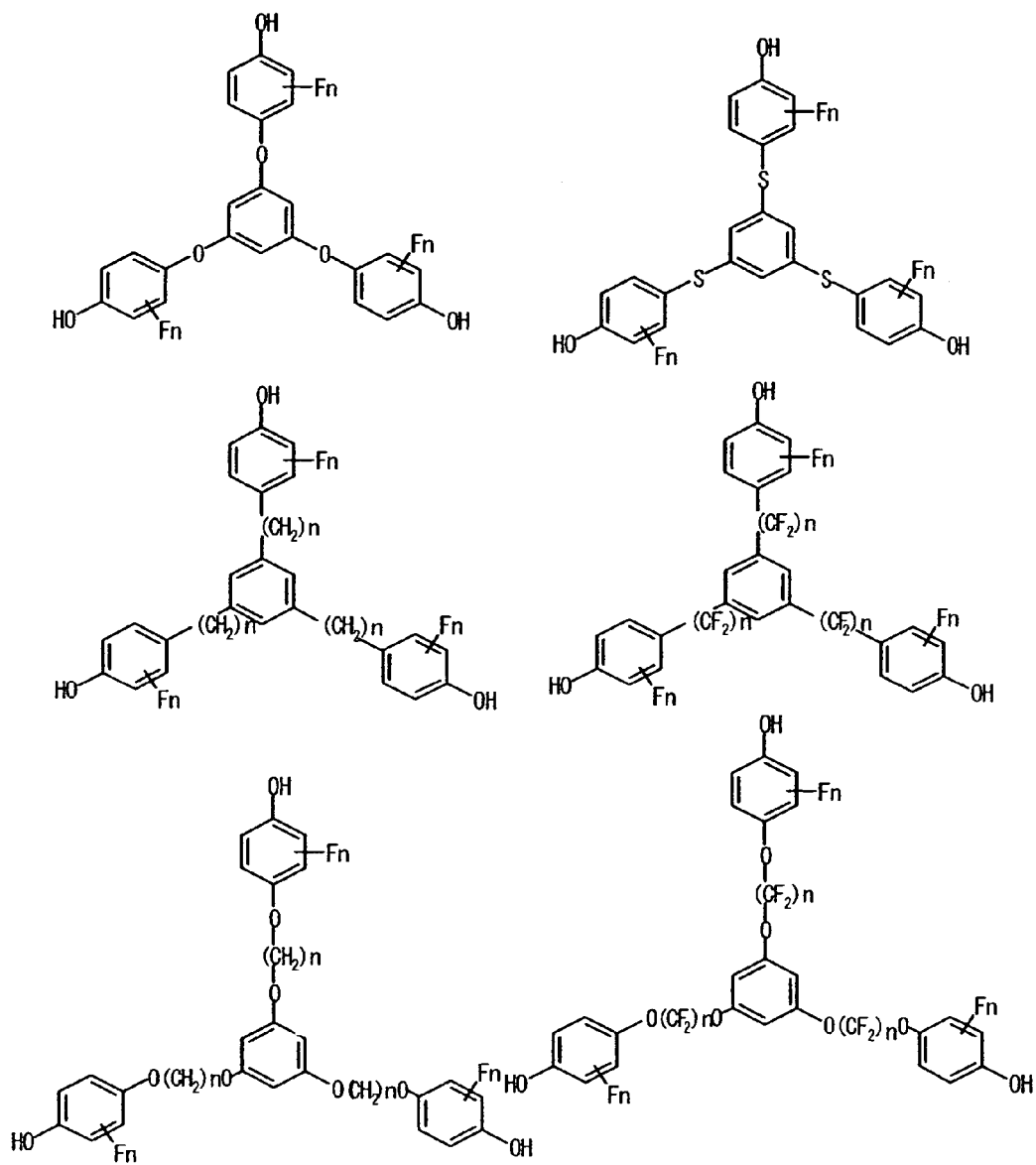
FIG. 6 shows other examples of a trifunctional compound according to the present invention.
Figure 7:
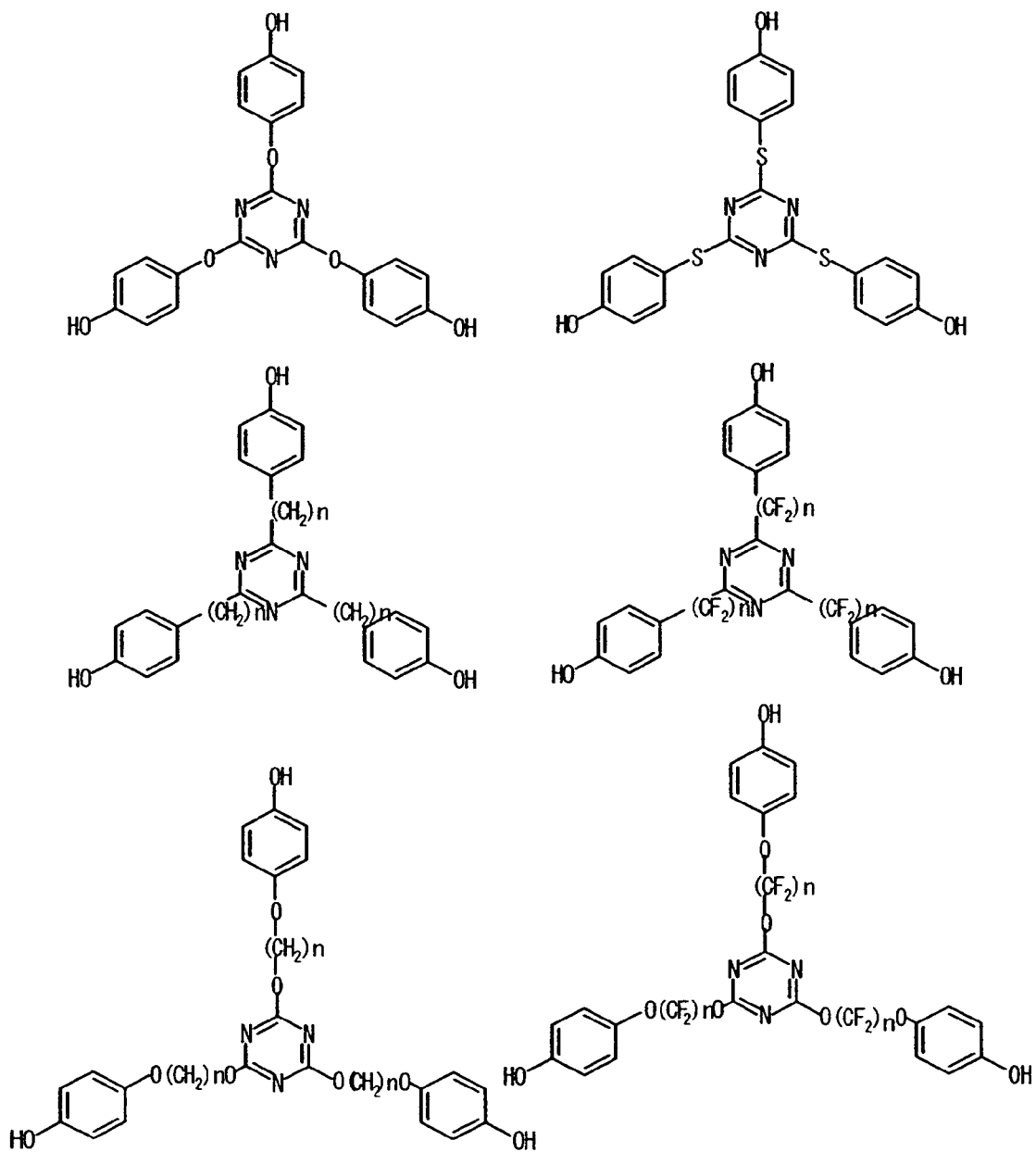
FIG. 7 shows other examples of a trifunctional compound according to the present invention.
Figure 8:
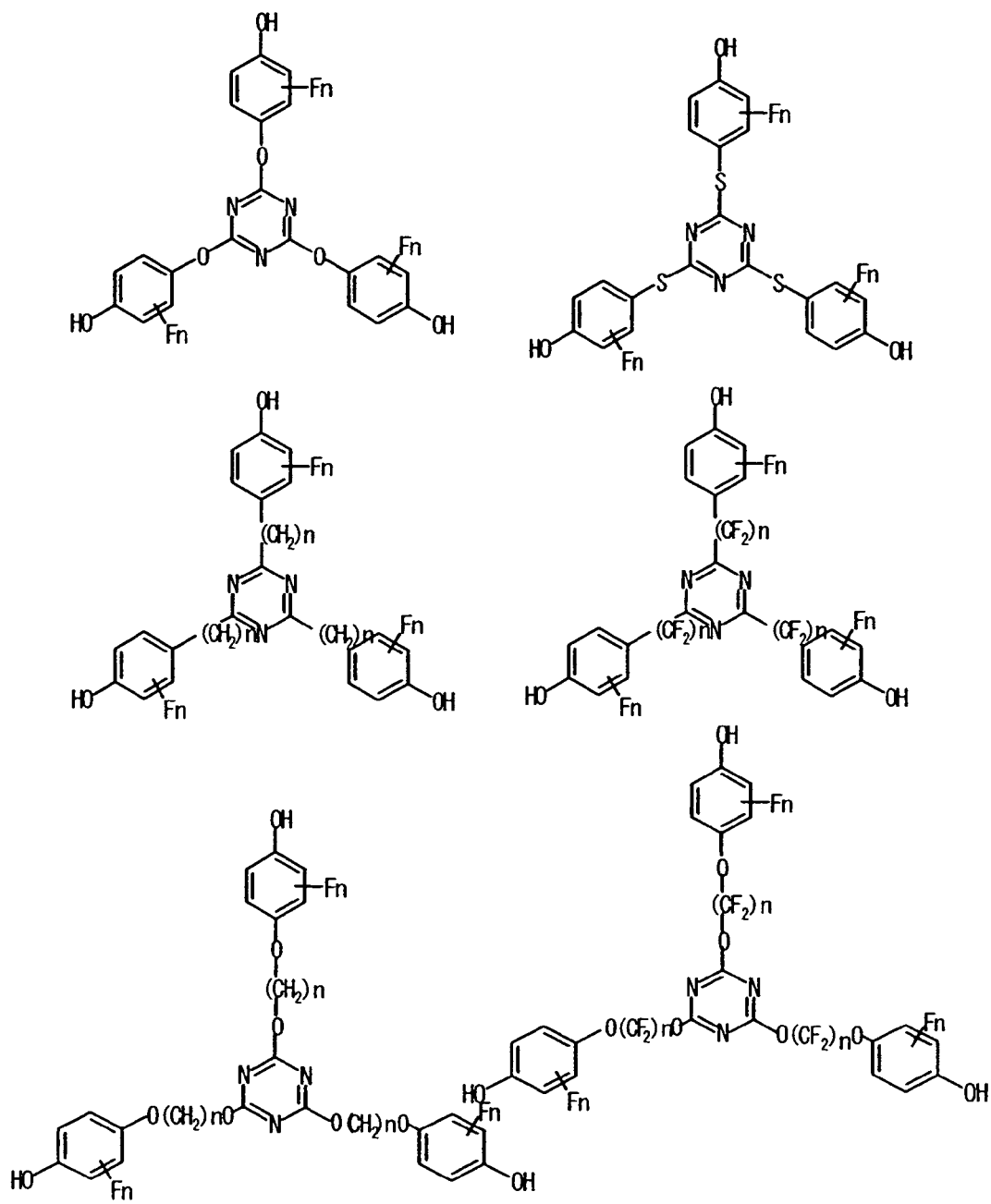
FIG. 8 shows other examples of a trifunctional compound according to the present invention.
Figure 9:
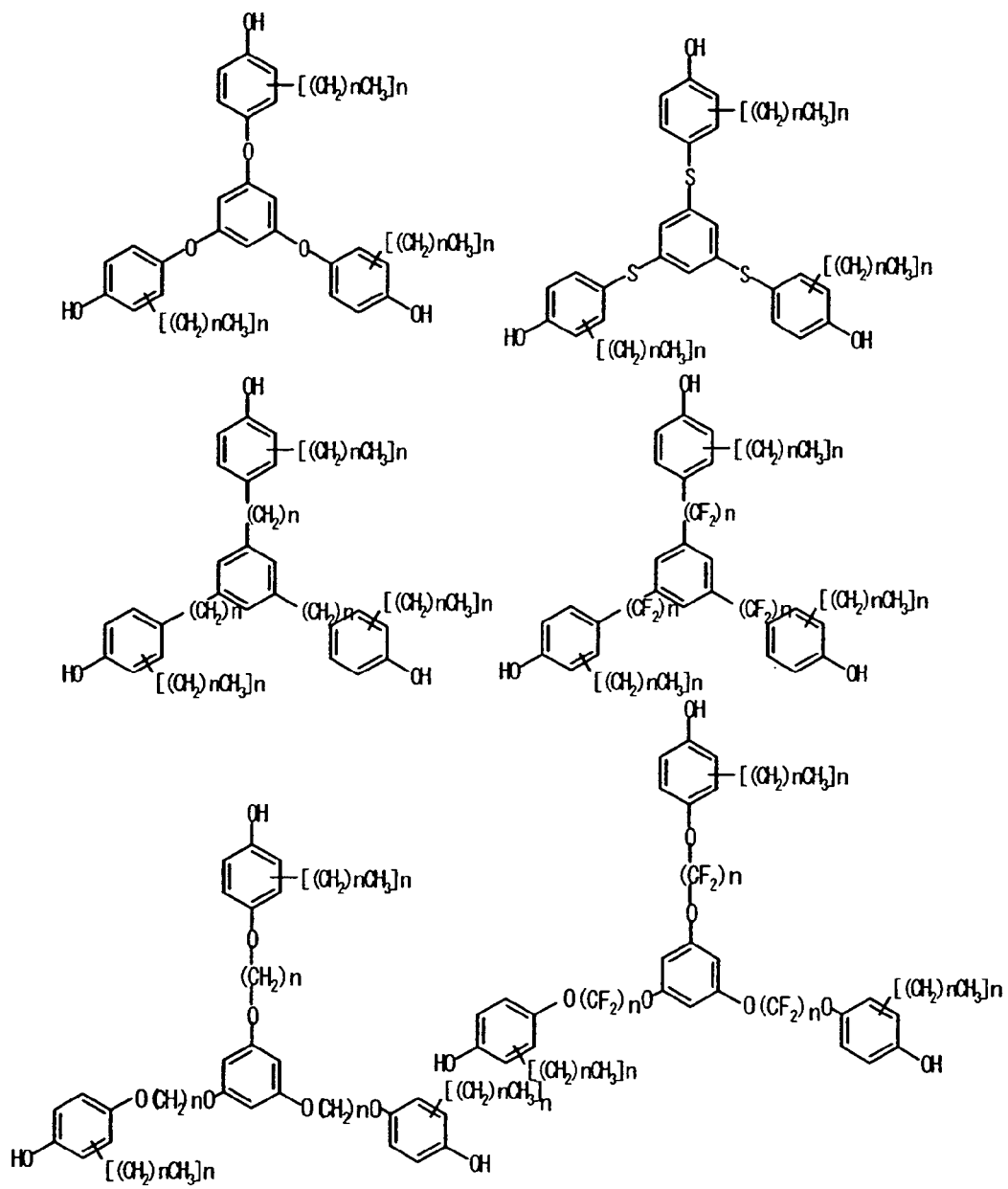
FIG. 9 shows other examples of a trifunctional compound according to the present invention.
Figure 10:
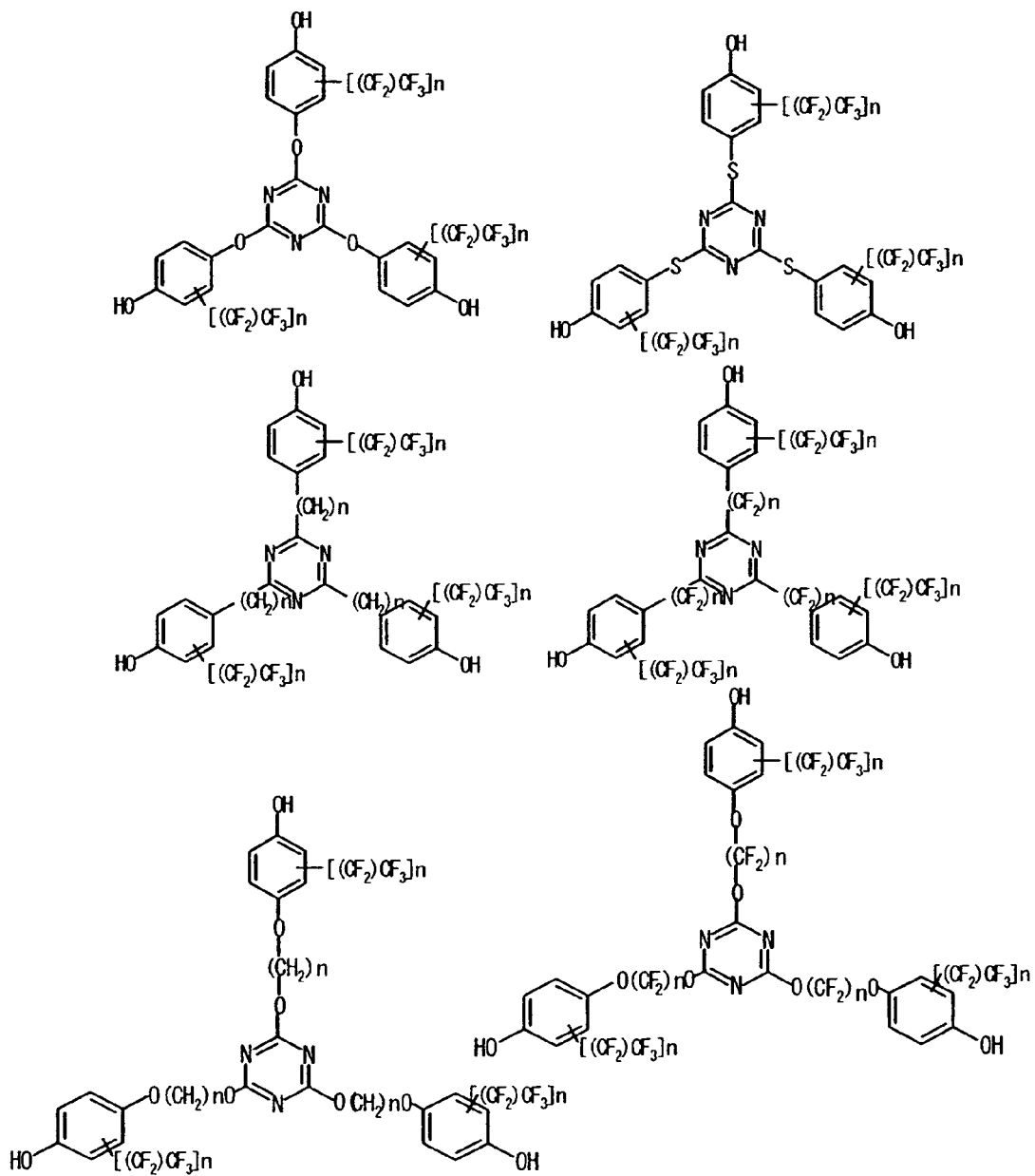
FIG. 10 shows other examples of a trifunctional compound according to the present invention.
Figure 11:
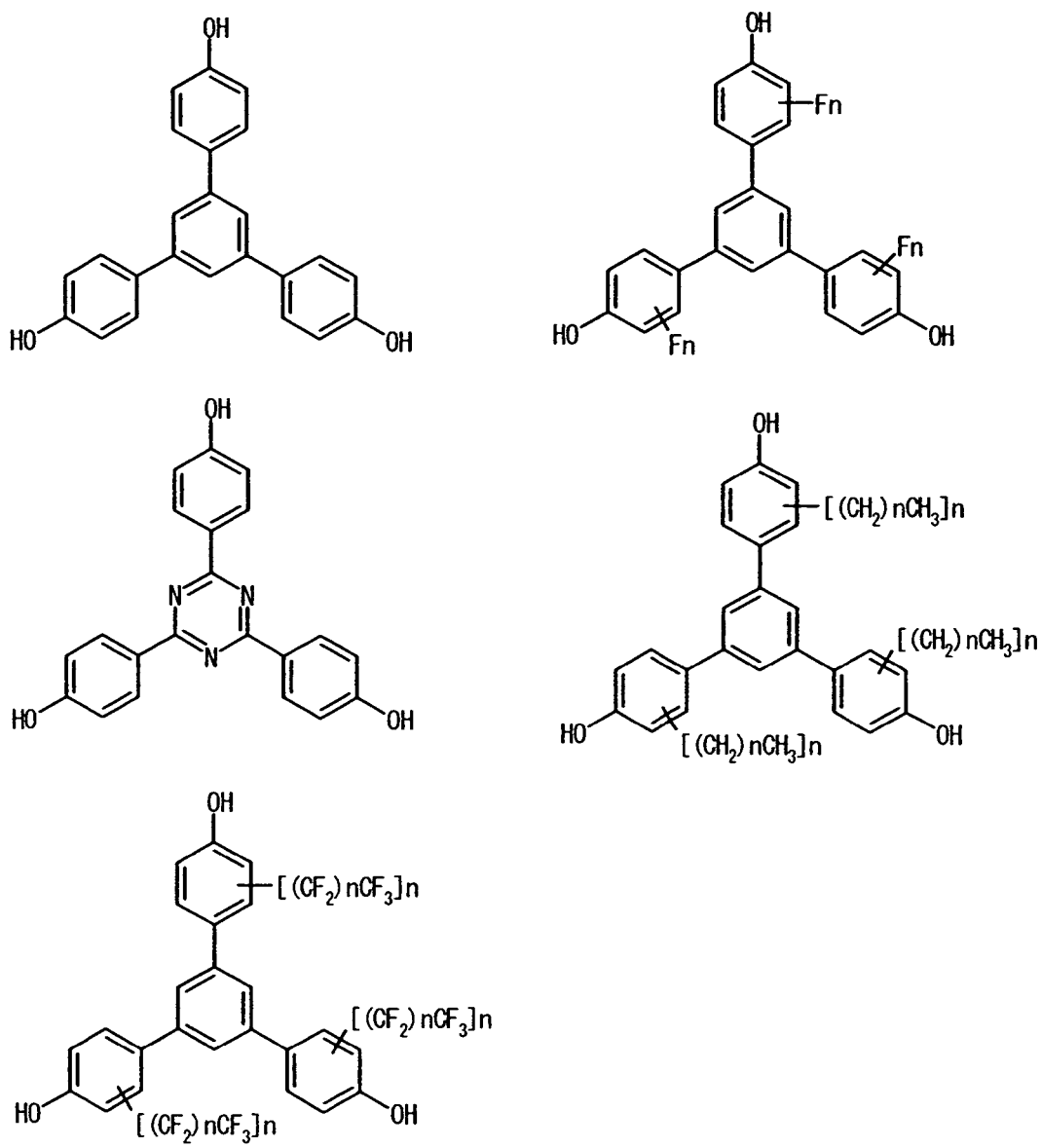
FIG. 11 shows other examples of a trifunctional compound according to the present invention.
Figure 12:
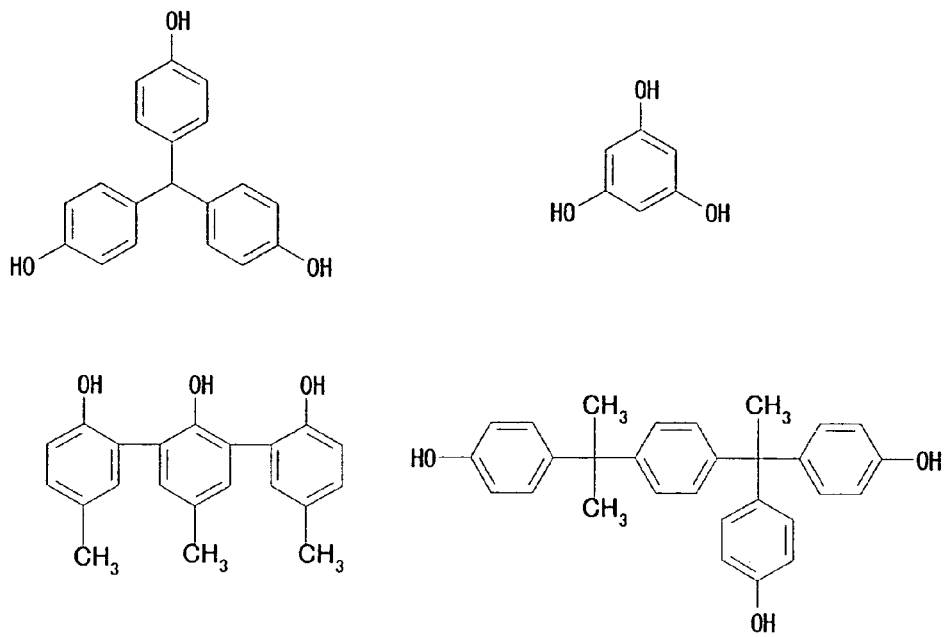
FIG. 12 shows other examples of a trifunctional compound according to the present invention.

As a linear structure, it is possible to employ at least one structure selected from the group consisting of a polyethersulfone structure, a polyetherketone structure and a polyimide structure as shown in FIG. 3, for example. Sulfonic acid groups may be bound to any benzene ring. For this purpose, it is possible, for example, to use an oligomer or a polymer having a plurality of structure units as shown in FIG. 4. In FIGS. 3 and 4, the vertical lines indicates that methyl groups are attached to both ends.

Among them, those having a polyethersulfone structure as shown in formula (5) is preferable in view of ease of synthesis and performance,

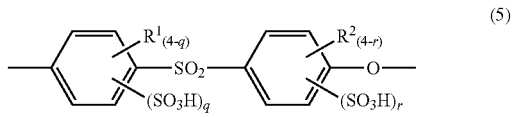

(in formula 5, $SO_3H$ may be bound to any position of a benzene ring; q and r are, independently from each other, an integer of from 0 to 2 wherein q and r are not zero at the same time; and $R^1$ and $R^2$ are, independently from each other, hydrogen, an aliphatic group or an aromatic group which may be bound to any position of a benzene ring).

A solid electrolyte having such a structure as described above can be produced by reacting a trifunctional compound with a compound having a linear structure. The trifunctional compound may be a so-called monomer or oligomer. As a compound having a linear structure, an oligomer or polymer can be used that has a group that can react with a trifunctional compound at the molecular end or an intermediate position of a molecule. Compounds having such a linear structure may be produced by oligomerization or polymerization of compounds that can form a linear structure.

Any known methods may be employed to obtain a solid electrolyte according to the present invention, but in the case of a polyethersulfone-type material, for example, a method for obtaining a solid electrolyte by polymerizing a compound having a structure represented by formula (6) or (7), at least one compound selected from the group consisting of a compound having a structure represented by formula (8), a compound having a structure represented by formula (9) and a compound having a structure represented by formula (10), and at least one compound selected from the group consisting of a compound having a structure represented by formula (11), a compound having a structure represented by formula (12) and a compound having a structure represented by formula (13), is easy and accordingly preferable. Here, at least one of the compound having a structure represented by formula (10) and the compound having a structure represented by formula (13) is present without fail in any case. For example, a method is considered in which a compound having a structure represented by formula (8), a compound having a structure represented by formula (9), a compound having a structure represented by formula (10), a compound having a structure represented by formula (11), a compound having a structure represented by formula (12), and a compound having a structure represented by formula (13) are polymerized to form an oligomer, and then the oligomer and a compound having a structure represented by formula (6) or (7) are polymerized. The compounds having structures represented by formulae (8) to (13) correspond to the above-described compound that can form a linear structure.

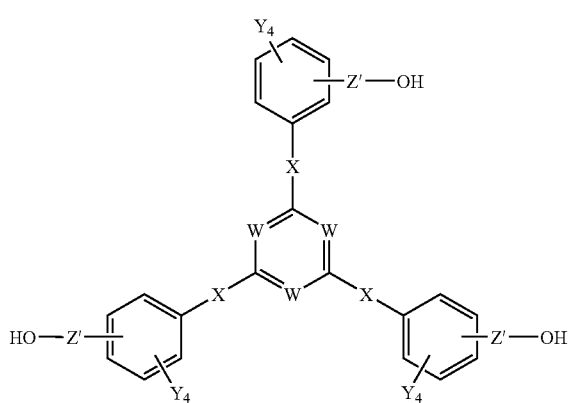
(6)

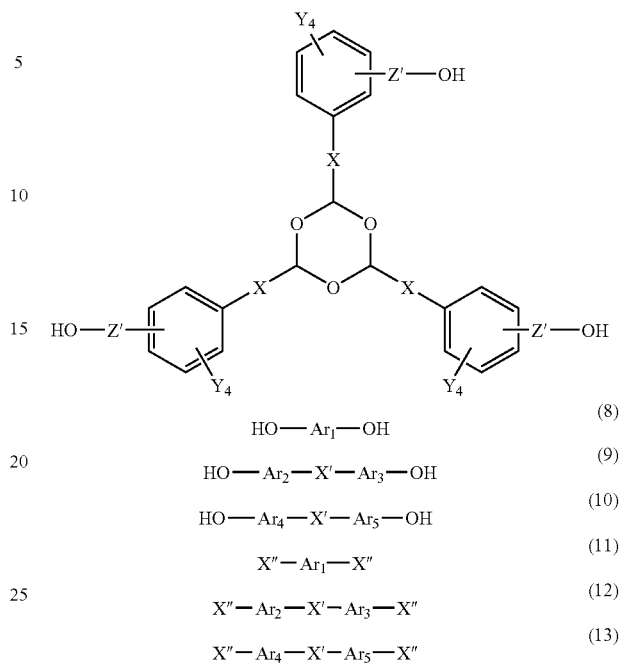
(7)

$$HO-Ar_1-OH \quad (8)$$

$$HO-Ar_2-X'-Ar_3-OH \quad (9)$$

$$HO-Ar_4-X'-Ar_5-OH \quad (10)$$

$$X''-Ar_1-X'' \quad (11)$$

$$X''-Ar_2-X'-Ar_3-X'' \quad (12)$$

$$X''-Ar_4-X'-Ar_5-X'' \quad (13)$$

In formulae (6) to (13), Ws are, each, same or different, N or C; Xs are, same or different, and in each formula independently from the other formulae, one of a direct bond, O, S, $(CH_2)_m$, $(CF_2)_m$, O—$(CH_2)_m$—O, and O—$(CF_2)_m$—O where m is an integer of from 1 to 10; Ys are, same or different, and in each formula independently from the other formulae, one of H, F, $CH_3(CH_2)_n$, and $CF_3(CF_2)_n$ where the suffix 4 of Y means that four Ys are bound to a benzene ring, and n is an integer of from 0 to 9; and Z's are, same or different, and in each formula independently from the other formulae, one of a direct bond, $(CH_2)_s$, $(CF_2)_s$, O—$(CH_2)_s$, and O—$(CF_2)_s$ where s is an integer of from 1 to 10, and Z's may be bound to any position of a benzene ring; $Ar_1$ to $Ar_5$ are, independently from each other, an aromatic group that may have a substituent group where at least one of $Ar_4$ and $Ar_5$ has, as a group directly bound to the aromatic group, one or more groups selected from the group consisting of a sulfonic acid group, a phosphonic acid group, a carboxylic acid group, a phosphoric acid group, and a salt of any of them; X's are, in each formula independently from the other formulae, one of —$SO_2$—, —$CH_2$—, —$C(CH_3)_2$—, —$C(CF_3)_2$—, —CO—, —O—, —$O(CH_2)_nO$—, —$O(CF_2)_nO$—, —$(CH_2)_n$—, —$(CF_2)_n$—, etc., where n is an integer of from 1 to 10; and X''s are, in each formula independently from the other formulae, and independently in each formula, chlorine or fluorine.

When at least one of $Ar_4$ and $Ar_5$ has, as a group directly bound to the aromatic group, one or more sulfonic acid groups or sulfonate groups, the structure shown in FIG. 4 is easily achieved.

Optimum amounts for them can be selected by actually synthesizing a solid electrolyte and investigating the properties.

A solid electrolyte according to the present invention is suitable for an electrolyte membrane used in solid polymer electrolyte fuel cells. It is particularly suitable for use in redox fuel cells using methanol (or Direct Methanol Fuel Cells, DMFCs).

As examples of a trifunctional compound for use in a solid electrolyte according to the present invention, trihydroxybenzene which may be obtained as a test reagent, 4,4'-4"-methylidenetriphenol-1,2,6-bis[(2-hydroxy-5-methylphenyl)methyl]-4-methylphenol, 4,4-[1-[4-[1-(4-hydroxyphenyl)-1-methylethyl]phenyl]ethylidene]bisphenol which may be obtained as industrial products are enumerated. When chemical stability is taken into consideration, compounds having a structure comprising three hydroxy groups (referred to as trihydroxy-containing compounds hereafter) such as shown in the following FIGS. 5 to 12 are preferable to these monomers.

Figure 13:
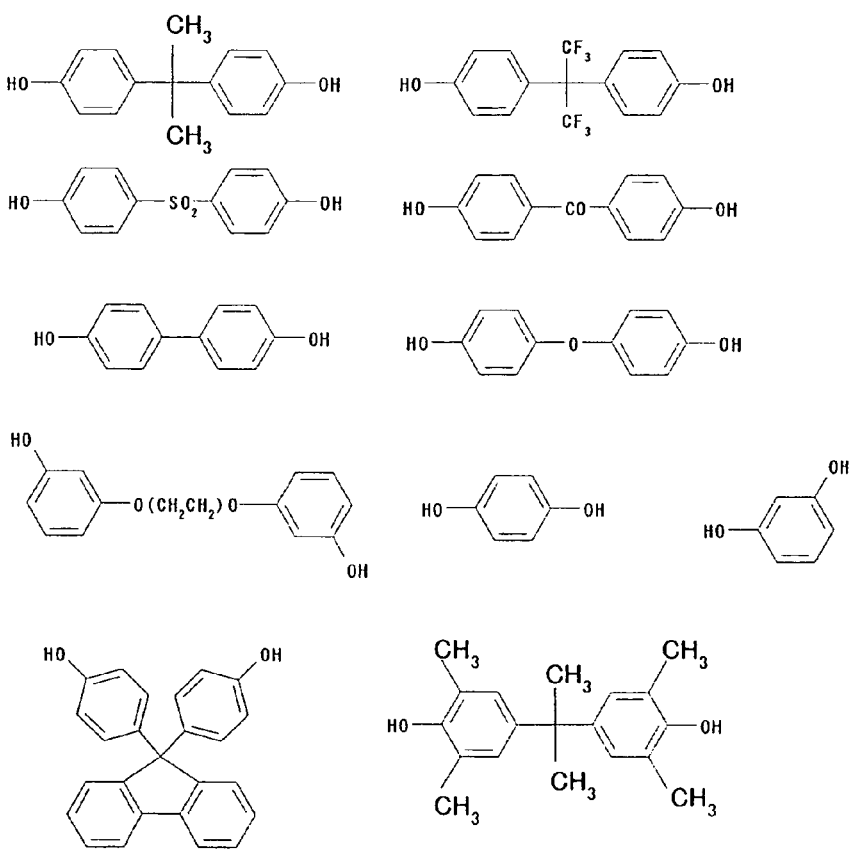
FIG. 13 shows examples of a compound that can form a linear structure according to the present invention.
Figure 16:
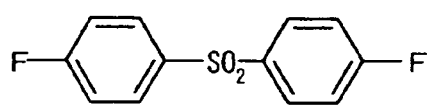
FIG. 16 shows the structures of 4-fluorophenylsulfone, 4-fluorobenzophenone, etc.
Figure 16:
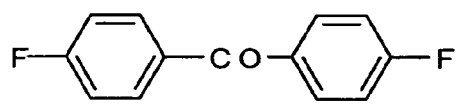
Figure 16:
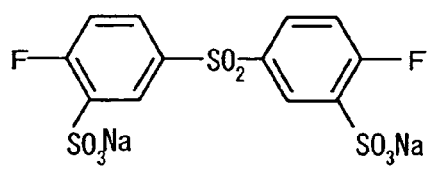
Figure 16:
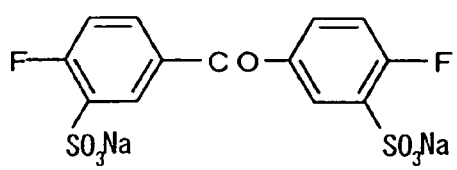

Also, as a compound that can form a linear structure for use in a solid electrolyte according to the present invention, for example, the compounds in FIGS. 13 and 15 may be used in an appropriate combination. Here, A in FIG. 15 means an acidic functional group such as a sulfonic acid group, a phosphonic acid group, a carboxylic acid group, a phosphoric acid group, etc., or a salt thereof (such as an alkali metal salts). The acidic functional group according to the present invention can be appropriately introduced into these compounds through known methods. The combination of 4-fluorophenylsulfone or 4-fluorobenzophenone as shown in FIG. 16, and a bisphenol or a compound obtained by introducing a sulfone group into a bisphenol, is particularly preferable.

As a method for synthesis of a solid electrolyte using these compounds, applicable are representative methods such as a method in which a phenol compound is converted to a salt type such as an alkali metal salt, followed by reaction with a halogen compound, and a method in which a bisphenol compound is converted to a salt type such as an alkali metal salt by using a base such as $K_2CO_3$ in a toluene solvent, water thus formed is removed by azeotropic dehydration with toluene, and then, toluene is removed to make the reaction proceed. However, the method is not limited to these. It is preferable to carry out these reactions under a stream of an inert gas such as nitrogen or argon, because water would cause side reactions.

Figure 17:
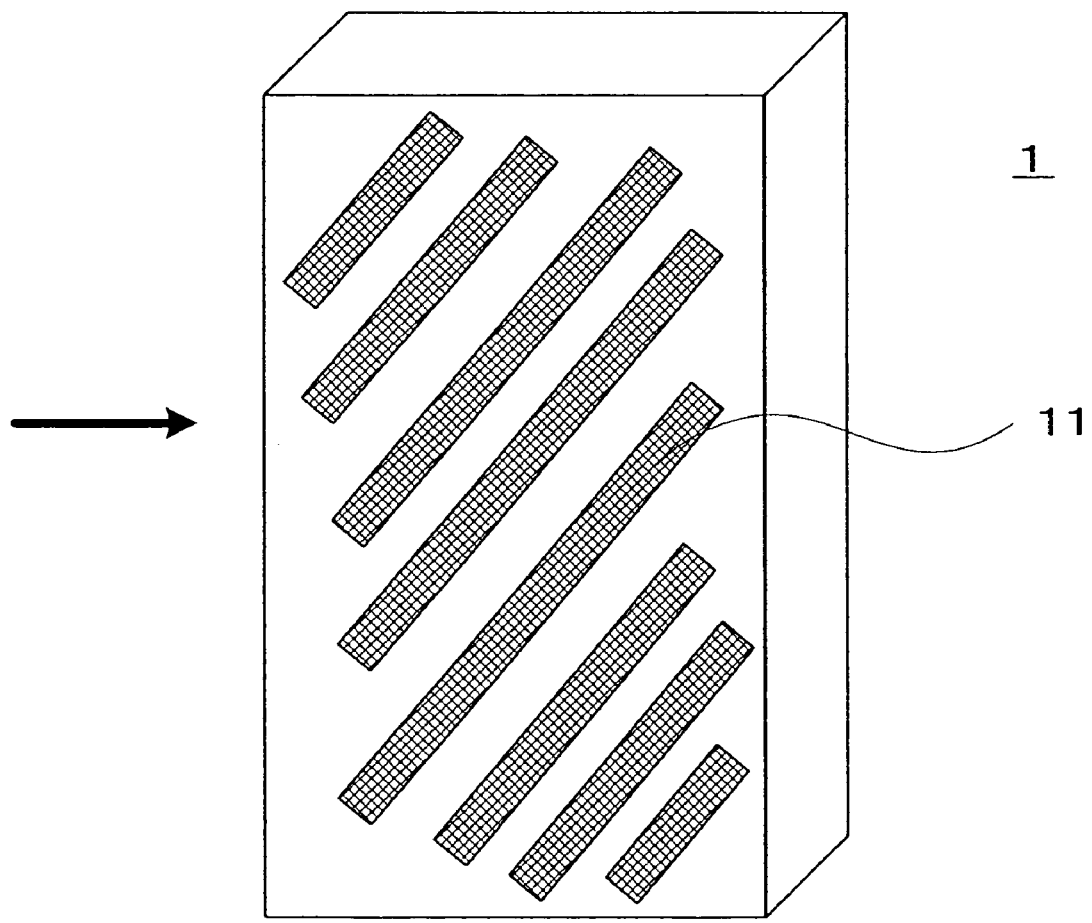
FIG. 17 is a schematic perspective view of an example of the outer structure of a fuel cell 1 according to the present invention.
Figure 18:
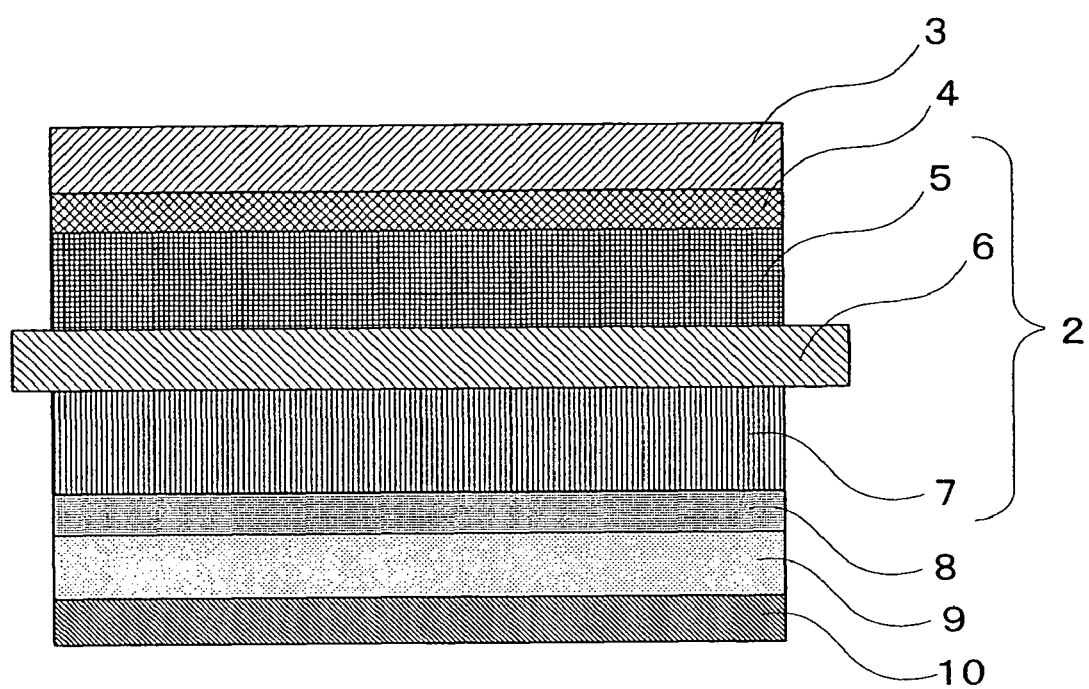
FIG. 18 is a schematic side cross-sectional view of the fuel cell 1 in FIG. 17 seen along the direction of the arrow.

FIG. 17 is a schematic perspective view of an example of the outer structure of a fuel cell 1 according to an aspect of the present invention, and FIG. 18 is a schematic side cross-sectional view of the fuel cell 1 in FIG. 17 seen along the direction of the arrow. This fuel cell is equipped with a power generation part 2 and a fuel storage part (not illustrated) as main parts. In the power generation part 2, as shown in FIG. 18, a positive electrode (also called an air electrode) 5 and a negative electrode (also called a fuel electrode) 7 are installed facing each other with an electrolyte layer 6 therebetween. A positive electrode current collector 3 is installed outside of the positive electrode 5 with a carbon paper 4 therebetween, and a negative electrode current collector 10 is installed outside of the negative electrode 7 with a carbon paper 8 and a shutter 9 therebetween.

The negative electrode 7 plays a role of oxidizing a fuel to take out protons and electrons, and can be prepared, for example, by applying/filling particulates composed of platinum, or an alloy of platinum and a transition metal such as ruthenium, a carbon powder, and an electrolyte for forming an electrolyte membrane onto/into a porous electroconductive membrane such as a carbon paper to fabricate a layered structure. The negative electrode current collector 10 is made of a mesh of a metal such as stainless steel and Ni, and serves to take out electrons generated at the negative electrode efficiently.

To compare, the positive electrode 5 produces water from the ions generated by reducing oxygen and protons generated at the negative electrode. The positive electrode 5 can be prepared, in a way similar to the way for the negative electrode, by applying/filling particulates composed of platinum, or an alloy of platinum and a transition metal such as ruthenium, a carbon powder, and an electrolyte for forming an electrolyte membrane onto/into a porous electroconductive membrane such as a carbon paper to fabricate a layered structure. The positive electrode current collector 3 is made of a mesh of a metal such as stainless steel and Ni, and serves to supply electrons to the positive electrode 5 efficiently.

The electrolyte layer 6 is a path to transport protons generated at the negative electrode 7 to the positive electrode 3, and is formed from an ion conductive material which does not have electron conductivity. Generally speaking, polyperfluorosulfonic acid type resin membranes, or Nafion membranes from du Pont to be more specific, are used for example.

A fuel storage part (not illustrated) is attached on the side not facing the electrolyte layer 6 of the negative electrode. The fuel is supplied from the fuel storage part to the negative electrode 7 via a fuel conduit (not illustrated) by means of natural transfer such as flowing and diffusion.

At the negative electrode, the fuel is decomposed to generate electrons, protons and other decomposed substances. When methanol is used as a fuel, for example, it is decomposed as shown in FIG. 14. Carbon dioxide which is generated when methanol is used as a fuel, dissipates from the negative electrode to the outside.

Regarding the side not facing the electrolyte layer 6 of the positive electrode, slits 11 are installed on the positive electrode current collector 3 as shown in FIG. 17 so that the outside air can be taken in by spontaneous diffusion. Moisture generated at the positive electrode is exhaled through the slits 11, too.

EXAMPLES

Next, examples and comparative examples according to the present invention are explained in detail. The above-described structures were used as a basis. In the following examples, each electrolyte membrane prepared was subjected to a thickness measurement, using a micrometer made by Mitutoyo Seiki (Mitutoyo Precision Instruments). Five points were measured and the averaged value was used as the film thickness.

Ion conductivity was measured in the planar direction of an electrolyte membrane, using it sufficiently hydrated in water. The distance between the electrodes were varied for the measurement of the resistance values so that the resistance values were obtained from the slope, and an ion conductivity was calculate based on these values.

The methanol crossover was quantitatively determined by fixing a prepared electrolyte with a fixture, one side of the electrolyte being contacted with pure water, and the other side, with a 10 vol. % aqueous methanol solution, and then, quantifying the amount of methanol transmitted through to the pure water side, using a GC-MS (gas chromatograph-mass spectrometer).

The fuel cells were fabricated under the following conditions.

Negative electrode: platinum-ruthenium alloy supported catalyst (TEC61E54, a product from Tanaka Kikinzoku Co.)
Positive electrode: platinum supported catalyst (TEC10E50E, a product from Tanaka Kikinzoku Co.)
Electrolyte: electrolyte membranes described in respective examples were used
Fuel: 10 vol. % aqueous methanol solution, 2.5 mL A constant current discharging test was carried out at 300 mA until the voltage was decreased down to 0.05V, and the time used for the discharging was measured.

Example 1

2,2-bis(4-hydroxyphenyl)hexafluoropropane (5.5 milli mole), 4-fluorophenylsulfone (see FIG. 16) (2 milli mole), 4-fluorophenylsulfone-3,3'-sodium disulfonate (see FIG. 16) (4 milli mole), anhydrous potassium carbonate (6.6 milli mole), N-methyl-2-pyrrolidone (16 mL), and toluene (10 mL) were weighed/measured out. They were poured into a 100 mL 3-necked flask equipped with a nitrogen conduit tube, Dean Stark trap, and stirrer, and azeotropic dehydration was carried out at 150° C. in an oil bath. It is to be noted that the reactions were carried out under a nitrogen atmosphere in all the examples.

After the azeotropic dehydration ceased, toluene was removed, and the polycondensation was made to proceed at 180° C. for 10 hours in order to form an oligomer. Then, after the oligomer was cooled down to room temperature, a solution obtained by dissolving trihydroxy-containing compound (0.33 milli mole) shown as (A) in FIG. 5 into N-methyl-2-pyrrolidone (2 mL) was added to the above oligomer solution, taking care not to let water in, the mixture was stirred at 100° C. for two hours, and then, subjected to reaction at 180° C. for 10 hours with stirring continued.

After cooling, the reaction solution was poured into water, and the synthesized polymer was recovered and purified by carrying out reprecipitation twice. After that, it was subjected to drying at 60° C. under a reduced pressure to produce a polymer. The thus-synthesized polymer was dissolved in dimethylformamide to make a 20 wt. % solution, and the solution was cast onto a glass substrate in a thickness of 300 μm, followed by heating and drying at 100° C., and drying under a reduced pressure at 60° C., to form a salt type membrane having sodium sulfonate groups. This membrane was immersed in 1 mole/L aqueous sulfuric acid solution overnight to change it into a proton type membrane having sulfonic acid groups. Then, the excessive acid was washed away by carrying out running water washing for a sufficient time. This proton type membrane having sulfonic acid groups is an electrolyte membrane according to the present invention. Using the thus-obtained electrolyte membrane, the thickness, ion conductivity, methanol crossover and cell discharge time of a fuel cell were determined.

Example 2

2,2-bis(4-hydroxyphenyl)hexafluoropropane (5.75 milli mole), 4-fluorophenylsulfone (2 milli mole), 4-fluorophenylsulfone-3,3'-sodium disulfonate (4 milli mole), anhydrous potassium carbonate (6.6 milli mole), N-methyl-2-pyrrolidone (16 mL) and toluene (10 mL) were weighed/measured out. They were poured into a 100 mL 3-necked flask equipped with a nitrogen conduit tube, Dean Stark trap, and stirrer, and azeotropic dehydration was carried out at 150° C. in an oil bath.

After the azeotropic dehydration ceased, toluene was removed, and the polycondensation was made to proceed at 180° C. for 10 hours in order to form an oligomer. Then, after the oligomer was cooled down to room temperature, a solution obtained by dissolving trihydroxy-containing compound (0.17 milli mole), which was the same compound as was used in EXAMPLE 1, into N-methyl-2-pyrrolidone (2 mL) was added to the oligomer solution, taking care not to let water in, the mixture was stirred at 100° C. for two hours, and then, subjected to reaction at 180° C. for 10 hours with stirring continued.

After cooling, the reaction solution was poured into water, and the synthesized polymer was recovered and purified by carrying out reprecipitation twice. After that, it was subjected to drying at 60° C. under a reduced pressure to produce a polymer. The thus-synthesized polymer was dissolved in dimethylformamide to make a 20 wt. % solution, and the solution was cast onto a glass substrate in a thickness of 300 μm, followed by heating and drying at 100° C., and drying under a reduced pressure at 60° C., to form a salt type membrane having sodium sulfonate groups.

This membrane was immersed in 1 mole/L aqueous sulfuric acid solution overnight to change it into a proton type membrane having sulfonic acid groups. Then, the excessive acid was washed away by carrying out running water washing for a sufficient time. Using the thus-obtained electrolyte membrane, the thickness, ion conductivity, methanol crossover and cell discharge time of a fuel cell were determined.

Example 3

2,2-bis(4-hydroxyphenyl)hexafluoropropane (5.9 milli mole), 4-fluorophenylsulfone (2 milli mole), 4-fluorophenylsulfone-3,3'-sodium disulfonate (4 milli mole), anhydrous potassium carbonate (6.6 milli mole), N-methyl-2-pyrrlidone (16 mL) and toluene (10 mL) were weighed/measured out. They were poured into a 100 mL 3-necked flask equipped with a nitrogen conduit tube, Dean Stark trap, and stirrer, and azeotropic dehydration was carried out at 150° C. in an oil bath.

After the azeotropic dehydration ceased, toluene was removed, and the polycondensation was made to proceed at 180° C. for 10 hours in order to form an oligomer. Then, after the oligomer was cooled down to room temperature, a solution obtained by dissolving trihydroxy-containing compound (0.07 milli mole), which was the same compound as was used in EXAMPLE 1, into N-methyl-2-pyrrolidone (2 mL) was added to the oligomer solution, taking care not to let water in, the mixture was stirred at 100° C. for two hours, and then, subjected to reaction at 180° C. for 10 hours with stirring continued.

After cooling, the reaction solution was poured into water, and the synthesized polymer was recovered and purified by carrying out reprecipitation twice. After that, it was subjected to drying at 60° C. under a reduced pressure to produce a polymer. The thus-synthesized polymer was dissolved in dimethylformamide to make a 20 wt. % solution, and the solution was cast onto a glass substrate in a thickness of 300 μm, followed by heating and drying at 100° C., and drying under a reduced pressure at 60° C., to form a salt type membrane having sodium sulfonate groups. This membrane was immersed in 1 mole/L aqueous sulfuric acid solution overnight to change it into a proton type membrane having sulfonic acid groups. Then, the excessive acid was washed away by carrying out running water washing for a sufficient time. Using the thus-obtained electrolyte membrane, the thickness, ion conductivity, methanol crossover and cell discharge time of a fuel cell were determined.

Example 4

Bisphenol A (5.5 milli mole), 4-fluorophenylsulfone (2 milli mole), 4-fluorophenylsulfone-3,3'-sodium disulfonate (4 milli mole), anhydrous potassium carbonate (6.6 milli mole), N-methyl-2-pyrrolidone (16 mL) and toluene (10 mL)

were weighed/measured out. They were poured into a 100 mL 3-necked flask equipped with a nitrogen conduit tube, Dean Stark trap, and stirrer, and azeotropic dehydration was carried out at 150° C. in an oil bath.

After the azeotropic dehydration ceased, toluene was removed, and the polycondensation was made to proceed at 180° C. for 10 hours in order to form an oligomer. Then, after the oligomer was cooled down to room temperature, a solution obtained by dissolving trihydroxy-containing compound (0.33 milli mole), which was the same compound as was used in EXAMPLE 1, into N-methyl-2-pyrrolidone (2 mL) was added to the oligomer solution, taking care not to let water in, the mixture was stirred at 100° C. for two hours, and then, subjected to reaction at 180° C. for 10 hours with stirring continued.

After cooling, the reaction solution was poured into water, and the synthesized polymer was recovered and purified by carrying out reprecipitation twice. After that, it was subjected to drying at 60° C. under a reduced pressure to produce a polymer.

The thus-synthesized polymer was dissolved in dimethylformamide to make a 20 wt. % solution, and the solution was cast onto a glass substrate in a thickness of 300 μm, followed by heating and drying at 100° C., and drying under a reduced pressure at 60° C., to form a salt type membrane having sodium sulfonate groups. This membrane was immersed in 1 mole/L aqueous sulfuric acid solution overnight to change it into a proton type membrane having sulfonic acid groups. Then, the excessive acid was washed away by carrying out running water washing for a sufficient time. Using the thus-obtained electrolyte membrane, the thickness, ion conductivity, methanol crossover and cell discharge time of a fuel cell were determined.

Example 5

2,2-bis(4-hydroxyphenyl)hexafluoropropane (5.5 milli mole), 4-fluorobenzophenone (2 milli mole), 4-fluorobenzophenone-3,3'-sodium disulfonate (4 milli mole), anhydrous potassium carbonate (6.6 milli mole), N-methyl-2-pyrrolidone (16 mL) and toluene (10 mL) were weighed/measured out. They were poured into a 100 mL 3-necked flask equipped with a nitrogen conduit tube, Dean Stark trap, and stirrer, and azeotropic dehydration was carried out at 150° C. in an oil bath.

After the azeotropic dehydration ceased, toluene was removed, and the polycondensation was made to proceed at 180° C. for 10 hours in order to form an oligomer. Then, after the oligomer was cooled down to room temperature, a solution obtained by dissolving trihydroxy-containing compound (0.33 milli mole), which was the same compound as was used in EXAMPLE 1, into N-methyl-2-pyrrolidone (2 mL) was added to the oligomer solution, taking care not to let water in, the mixture was stirred at 100° C. for two hours, and then, subjected to reaction at 180° C. for 10 hours with stirring continued.

After cooling, the reaction solution was poured into water, and the synthesized polymer was recovered and purified by carrying out reprecipitation twice. After that, it was subjected to drying at 60° C. under a reduced pressure to produce a polymer.

The thus-synthesized polymer was dissolved in dimethylformamide to make a 20 wt. % solution, and the solution was cast onto a glass substrate in a thickness of 300 μm, followed by heating and drying at 100° C., and drying under a reduced pressure at 60° C., to form a salt type membrane having sodium sulfonate groups. This membrane was immersed in 1 mole/L aqueous sulfuric acid solution overnight to change it into a proton type membrane having sulfonic acid groups. Then, the excessive acid was washed away by carrying out running water washing for a sufficient time. Using the thus-obtained electrolyte membrane, the thickness, ion conductivity, methanol crossover and cell discharge time of a fuel cell were determined.

Comparative Example 1

2,2-bis(4-hydroxyphenyl)hexafluoropropane (6 milli mole), 4-fluorophenylsulfone (4 milli mole), 4-fluorophenylsulfone-3,3'-sodium disulfonate (2 milli mole), anhydrous potassium carbonate (6.6 milli mole), N-methyl-2-pyrrolidone (16 mL) and toluene (10 mL) were weighed/measured out. They were poured into a 100 mL 3-necked flask equipped with a nitrogen conduit tube, Dean Stark trap, and stirrer, and azeotropic dehydration was carried out at 150° C. in an oil bath.

After the azeotropic dehydration ceased, toluene was removed, and the polycondensation was made to proceed at 180° C. for 10 hours. After cooling, the reaction solution was poured into water, and the synthesized polymer was recovered and purified by carrying out reprecipitation twice. After that, it was subjected to drying at 60° C. under a reduced pressure to produce a polymer.

The thus-synthesized polymer was dissolved in dimethylformamide to make a 20 wt. % solution, and the solution was cast onto a glass substrate in a thickness of 300 μm, followed by heating and drying at 100° C., and drying under a reduced pressure at 60° C., to form a salt type membrane having sodium sulfonate groups. This membrane was immersed in 1 mole/L aqueous sulfuric acid solution overnight to change it into a proton type membrane having sulfonic acid groups. Then, the excessive acid was washed away by carrying out running water washing for a sufficient time. Using the thus-obtained electrolyte membrane, the thickness, ion conductivity, methanol crossover and cell discharge time of a fuel cell were determined.

Comparative Example 2

2,2-bis(4-hydroxyphenyl)hexafluoropropane (6 milli mole), 4-fluorophenylsulfone (2.5 milli mole), 4-fluorophenylsulfone-3,3'-sodium disulfonate (3.5 milli mole), anhydrous potassium carbonate (6.6 milli mole), N-methyl-2-pyrrolidone (16 mL) and toluene (10 mL) were weighed/measured out. They were poured into a 100 mL 3-necked flask equipped with a nitrogen conduit tube, Dean Stark trap, and stirrer, and azeotropic dehydration was carried out at 150° C. in an oil bath.

After the azeotropic dehydration ceased, toluene was removed, and the polycondensation was made to proceed at 180° C. for 10 hours. After cooling, the reaction solution was poured into water, and the synthesized polymer was recovered and purified by carrying out reprecipitation twice. After that, it was subjected to drying at 60° C. under a reduced pressure to produce a polymer.

The thus-synthesized polymer was dissolved in dimethylformamide to make a 20 wt. % solution, and the solution was cast onto a glass substrate in a thickness of 300 μm, followed by heating and drying at 100° C., and drying under a reduced pressure at 60° C., to form a salt type membrane having sodium sulfonate groups. This membrane was immersed in 1 mole/L aqueous sulfuric acid solution overnight to change it into a proton type membrane having sulfonic acid groups. Then, the excessive acid was washed away by carrying out running water washing for a sufficient time. Using the thus-obtained electrolyte membrane, the thickness, ion conductivity, methanol crossover and cell discharge time of a fuel cell were determined.

Comparative Example 3

2,2-bis(4-hydroxyphenyl)hexafluoropropane (6 milli mole), 4-fluorophenylsulfone (2 milli mole), 4-fluorophenylsulfone-3,3'-sodium disulfonate (4 milli mole), anhydrous potassium carbonate (6.6 milli mole), N-methyl-2-pyrrolidone (16 mL) and toluene (10 mL) were weighed/measured out. They were poured into a 100 mL 3-necked flask equipped with a nitrogen conduit tube, Dean Stark trap, and stirrer, and azeotropic dehydration was carried out at 150° C. in an oil bath.

After the azeotropic dehydration ceased, toluene was removed, and the polycondensation was made to proceed at 180° C. for 10 hours. After cooling, the reaction solution was poured into water to recover the synthesized polymer. However, most of the reaction solution was dissolved in water. Accordingly, the following steps were carried out only using the thus-recovered portion.

The portion was subjected to drying at 60° C. under a reduced pressure to produce a polymer. The thus-synthesized polymer was dissolved in dimethylformamide to make a 20 wt. % solution, and the solution was cast onto a glass substrate in a thickness of 300 μm, followed by heating and drying at 100° C., and drying under a reduced pressure at 60° C., to form a salt type membrane having sodium sulfonate groups.

This membrane was immersed in 1 mole/L aqueous sulfuric acid solution overnight to change it into a proton type membrane having sulfonic acid groups. Then, the excessive acid was washed away by carrying out running water washing for a sufficient time. Using the thus-obtained electrolyte membrane, the thickness, ion conductivity, methanol crossover and cell discharge time of a fuel cell were determined.

The results are shown in TABLE 1. The data other than the thickness in TABLE 1 are relative values to those values for the N112 ion conductivity, N112 methanol crossover and fuel cell discharge time of a fuel cell fabricated in the same way as for EXAMPLE 1 except that a Nafion membrane, N112, of du Pont was used as the electrolyte membrane wherein the latter values were defined as 1.00. The electrolyte membranes according to the present invention indicated high ion conductivity values as shown in TABLE 1, while no dissolving of the electrolyte membranes was found, and the methanol crossover values were kept at a low level.

In TABLE 1, the ion-exchange capacities of the respective electrolyte membranes are also shown. An ion-exchange capacity was determined by fully washing a 100 g sample with pure water; then immersing it into a 1M HCl solution overnight to convert all the ion-exchanging groups (—$SO_3$) into H type; then, washing it fully with pure water until the water used for washing indicated a pH of 7; then, further immersing it in pure water for three hours; then, wiping out all the water attached to the membrane; immersing it in 100 mL of 0.01M NaOH overnight; sampling 10 mL of the supernatant liquid; and then, subjecting the sample to titration with 0.01M HCl.

TABLE 1

|  | Thickness (μm) | Ion conductivity | Methanol crossover | Service time | Ion-exchange capacity (m equivalent/g) |
|---|---|---|---|---|---|
| Nafion N112 | 60 | 1.00 | 1.00 | 1.00 | 0.90 |
| EXAMPLE 1 | 59 | 1.56 | 0.66 | 1.52 | 1.90 |
| EXAMPLE 2 | 57 | 1.46 | 0.75 | 1.35 | 1.91 |
| EXAMPLE 3 | 56 | 1.32 | 0.82 | 1.22 | 1.91 |
| EXAMPLE 4 | 58 | 1.47 | 0.62 | 1.63 | 2.21 |
| EXAMPLE 5 | 57 | 1.50 | 0.67 | 1.51 | 2.24 |
| COMPARATIVE EXAMPLE 1 | 53 | 0.32 | 0.36 | 2.01 | 1.04 |
| COMPARATIVE EXAMPLE 2 | 56 | 0.81 | 0.87 | 1.05 | 1.70 |
| COMPARATIVE EXAMPLE 3 | 52 | 1.23 | 1.36 | 0.71 | 1.92 |

INDUSTRIAL APPLICABILITY

The present invention is applied to fuel cells. Particularly, it is utilized for fuel cells for use in miniaturized and weight-reduced information devices with high functionality.

What is claimed is:

1. A redox fuel cell comprising:
a negative electrode configured to oxidize methanol to take out protons and electrons;
a positive electrode configured to produce water from ions generated by reducing oxygen and the protons generated at the negative electrode; and
a membrane of a solid polymer electrolyte sandwiched between the positive electrode and the negative electrode, said solid polymer electrolyte comprising a three-armed structure represented by formula (2),

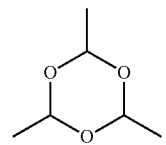

(2)

wherein said solid polymer electrolyte comprises an acidic functional group.

2. A redox fuel cell according to claim 1, wherein said acidic functional group is at least one group selected from the group consisting of a sulfonic acid group, a phosphonic acid group, a carboxylic acid group and a phosphoric acid group.

3. A redox fuel cell according to claim 1, wherein said solid polymer electrolyte comprises an ion-exchange capacity in the range of from 0.1 to 3.5 milli equivalent/g.

4. A redox fuel cell according to claim 1, wherein said solid polymer electrolyte comprises at least one structure selected from the group consisting of a polyethersulfone structure, a polyetherketone structure and a polyimide structure.

5. A redox fuel cell according to claim 1, wherein said solid polymer electrolyte further comprises a structure represented by formula (5),

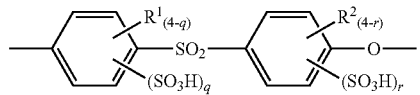

(in formula (5), $SO_3H$ may be bound to any position of a benzene ring; q and r are, independently from each other, an integer of from 0 to 2 where q and r are not zero at the same time; $R^1$ and $R^2$ are, independently from each other, hydrogen, an aliphatic group or an aromatic group which may be bound to any position of a benzene ring).

6. A redox fuel cell according to claim 1, said fuel cell comprising a positive electrode current collector, and a negative electrode current collector.

* * * * *